United States Patent
Shimada et al.

(10) Patent No.: US 9,007,509 B2
(45) Date of Patent: Apr. 14, 2015

(54) FOREIGN SUBSTANCE REMOVING DEVICE AND IMAGE PICKUP DEVICE

(75) Inventors: Akira Shimada, Kawasaki (JP); Kaishi Ohashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 557 days.

(21) Appl. No.: 13/290,975

(22) Filed: Nov. 7, 2011

(65) Prior Publication Data

US 2012/0120307 A1 May 17, 2012

(30) Foreign Application Priority Data

Nov. 16, 2010 (JP) ................. 2010-256312

(51) Int. Cl.
- *H04N 5/225* (2006.01)
- *B08B 7/02* (2006.01)
- *G03B 11/00* (2006.01)
- *G03B 17/14* (2006.01)
- *H04N 5/217* (2011.01)

(52) U.S. Cl.
CPC . *B08B 7/02* (2013.01); *G03B 11/00* (2013.01); *G03B 17/14* (2013.01); *H04N 5/2171* (2013.01)

(58) Field of Classification Search
CPC ............... H04N 5/2254; H04N 5/2171; G02B 27/0006; G03B 2205/0061
USPC .................. 348/335, 340, 373, 374; 396/535; 15/94; 359/507; 310/321
See application file for complete search history.

(56) References Cited

U.S. PATENT DOCUMENTS

| | | | |
|---|---|---|---|
| 2003/0202114 A1 | 10/2003 | Takizawa | |
| 2007/0223966 A1* | 9/2007 | Fujimoto | 399/123 |
| 2007/0296819 A1 | 12/2007 | Takizawa | |
| 2008/0226285 A1* | 9/2008 | Matsumoto | 396/439 |
| 2009/0207493 A1 | 8/2009 | Ohashi | |
| 2011/0096397 A1 | 4/2011 | Ohashi | |
| 2011/0228389 A1* | 9/2011 | Ohashi | 359/507 |

FOREIGN PATENT DOCUMENTS

| | | |
|---|---|---|
| JP | 2003-319222 A | 11/2003 |
| JP | 2007-267189 A | 10/2007 |
| JP | 2008-005058 A | 1/2008 |
| JP | 2008-28665 A | 2/2008 |
| JP | 2008-207170 A | 9/2008 |
| JP | 2008-211629 A | 9/2008 |
| JP | 2011-91776 A | 5/2011 |

\* cited by examiner

*Primary Examiner* — Paul Berardesca
(74) *Attorney, Agent, or Firm* — Canon U.S.A, Inc. IP Division

(57) ABSTRACT

A dust removing device includes an oscillation body including at least an elastic member and an electromechanical energy conversion element which is fixed to the elastic member, wherein the electromechanical energy conversion element is configured to excite oscillation in the elastic member to remove dust. A rigidity-increasing member configured to enhance rigidity of the oscillation body in the direction of a node line of the oscillation is provided on at least one of the elastic member and the electromechanical energy conversion element.

10 Claims, 20 Drawing Sheets

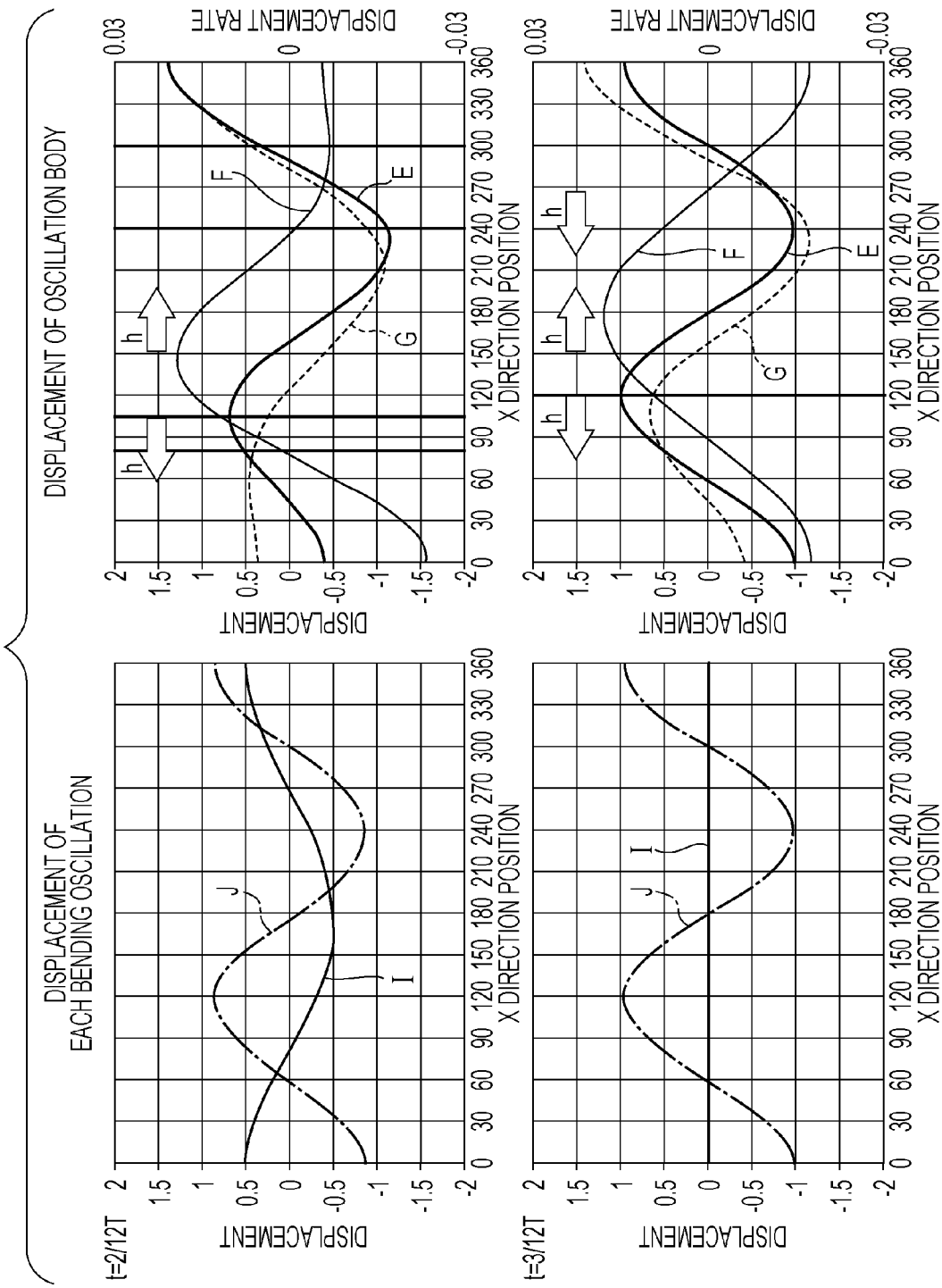

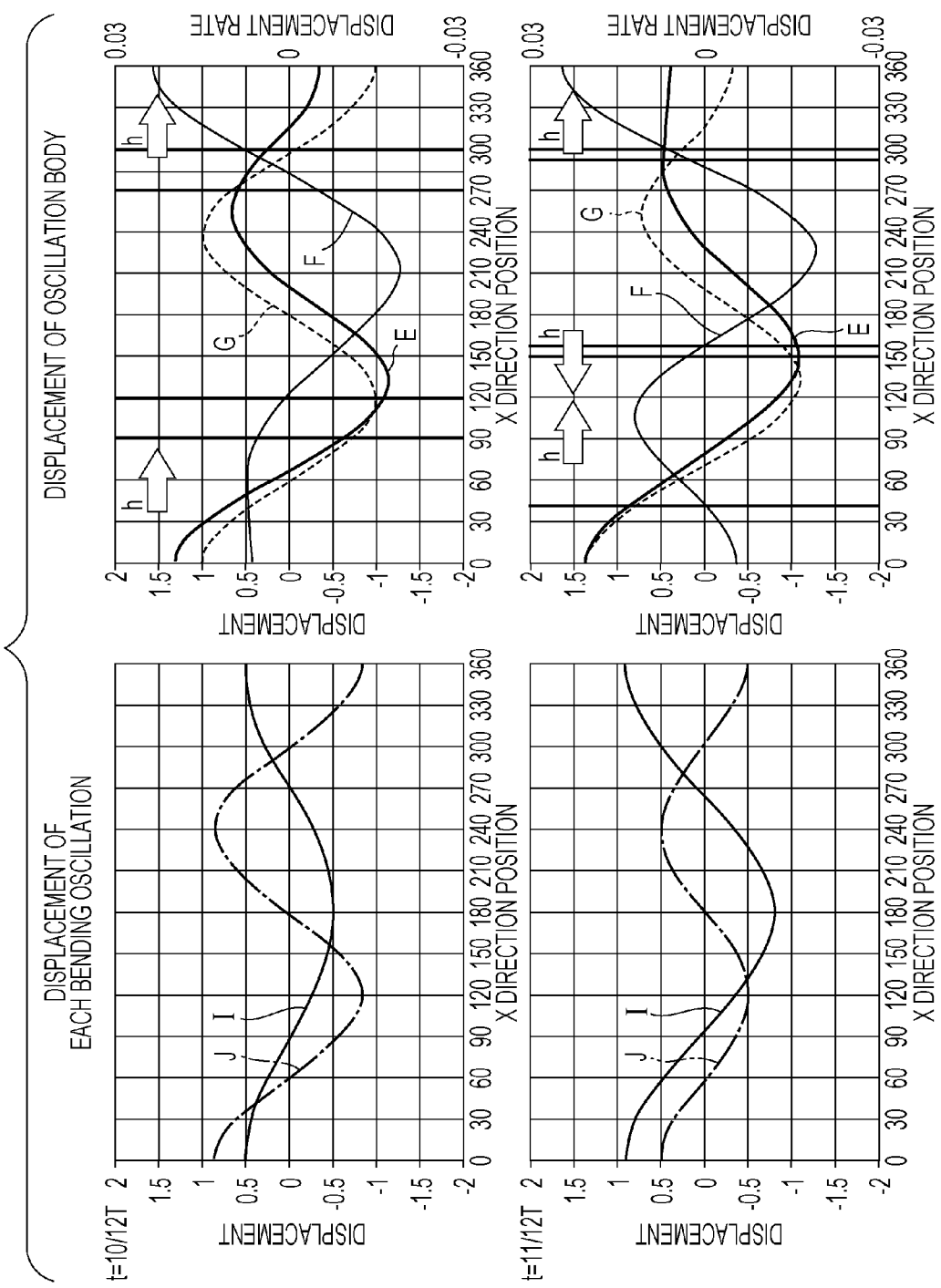

FOREIGN SUBSTANCE REMOVING DEVICE AND IMAGE PICKUP DEVICE

BACKGROUND OF THE INVENTION

1. Field of the Invention

The present invention relates to a dust removing device (which is also called a foreign substance removing device) and an image pickup device which incorporates the dust removing device.

2. Description of the Related Art

In an image pickup device, such as a digital camera, which acquires an image by converting an image of photographic subject into electrical signals, an image pickup element, such as CCD and CMOS, receives photographing light beams and outputs photoelectric conversion signals. The photoelectric conversion signals are converted into image data. The image data is recorded on a recording medium, such as a memory card. In such an image pickup device, an optical low pass filter or an infrared absorption filter is provided at the photographic subject side of the image pickup element. If dust adheres to a surface of these filters, dust-adhering points appear on the photographic image and thereby image quality is impaired.

Especially in a digital single lens reflex camera with interchangeable lenses, mechanical operating units, such as a shutter and a quick return mirror, are provided near the image pickup element; in such camera, dust produced at the operating units may adhere to the image pickup element and the surface of the filter. At the time of interchanging lenses, dust may enter a camera body through an opening of a lens mount and adhere to the camera body.

In order to avoid such a phenomenon, a dustproof optical member is provided in the United States Patent No. 2003/202114A1. In this patent, a piezoelectric element which excites oscillation is provided on the periphery of the optical member, and resonance oscillation is excited by alternately exciting oscillation in a 1st-order oscillation mode and oscillation in a 2nd-order oscillation mode which are standing waves. With this configuration, dust adhering to the surface of the optical member is removed.

The United States Patent No. 2009/207493A1 proposes a dust removing device capable of displacing dust in a desired direction by exciting an elliptic movement in an oscillation body provided with an optical member. FIG. 17 illustrates, in a schematic diagram, a configuration of the dust removing device disclosed in the United States Patent No. 2009/207493A1. An oscillation body 4 which includes an optical member 1 is provided at the light incidence side of an image pickup element 6. Piezoelectric elements 2-1 and 2-2 are provided in the oscillation body 4 at out of alignment positions along a direction in which node lines of out-of-surface bending oscillation. Alternating voltages which are the same in cycle and different in time phases by 90 degrees are applied to the piezoelectric element 2-1 and piezoelectric element 2-2.

Frequency of the applied alternating voltage is the frequency between resonance frequency in the m-th oscillation mode (m is a natural number) and resonance frequency in the (m+1)-th oscillation mode which causes out-of-surface deformation along the longitudinal direction of the oscillation body 4. Oscillation in the m-th oscillation mode having a response of a resonance phenomenon and oscillation in the (m+1)-th oscillation mode having a 90-degree time phase difference (i.e., a phase advanced 90 degrees to the m-th out-of-surface bending oscillation) are excited in the oscillation body 4 in the same amplitude and at the same oscillation cycle. Composite oscillation (i.e., traveling waves) constituted by the oscillations in these two oscillation modes is excited in the oscillation body 4. When the composite oscillation hits dust upward in the out-of-surface direction, dust receives normal direction force of the surface of the oscillation body 4 to be popped and displaced in the desired direction.

In the dust removing devices of the above-mentioned two United States Patents, oscillation in an unnecessary oscillation mode which is different from the main oscillation mode for the removal of dust may sometimes be excited in the oscillation body. When oscillation in the unnecessary oscillation mode is excited, the efficiency with which dust is removed becomes low.

Especially, in the oscillator disclosed in the United States Patent No. 2009/207493A1, an unnecessary oscillation mode often exists. If such an unnecessary oscillation mode exists, there may be positions at which the in-surface direction is inverted when the optical member 1 hits dust adhering thereon upward in the out-of-surface direction or positions at which the in-surface direction component is small. As a result, in some locations, dust cannot be displaced due to in-surface waves traveling in opposing directions or the efficiency with which dust is displaced becomes low due to reduced displacement force with respect to adhesive force of dust.

The present invention provides a dust removing device and an image pickup device capable of efficiently removing dust by oscillation.

SUMMARY OF THE INVENTION

A dust removing device (which is also called a foreign substance removing device) according an aspect of the present invention includes an oscillation body including at least an elastic member and an electromechanical energy conversion element which is fixed to the elastic member, wherein the electromechanical energy conversion element is configured to excite oscillation in the elastic member to remove dust, wherein a rigidity-increasing member configured to enhance rigidity of the oscillation body in the direction of a node line of the oscillation is provided on at least one of the elastic member and the electromechanical energy conversion element.

According to aspects of the present invention, since a rigidity-increasing member which enhances rigidity in the direction of the node line of oscillation in a main oscillation mode is provided, oscillation in an unnecessary oscillation mode can be reduced and thus dust can be removed efficiently.

Further features according to the present invention will become apparent from the following description of exemplary embodiments with reference to the attached drawings.

BRIEF DESCRIPTION OF THE DRAWINGS

FIGS. 8A and 8B illustrate graphs of each bending oscillation and displacement of the oscillation body in each time phase.

FIGS. 10A and 10B illustrate graphs of each bending oscillation and displacement of the oscillation body in each time phase.

DESCRIPTION OF THE EMBODIMENTS

First Embodiment

Figure 1A:
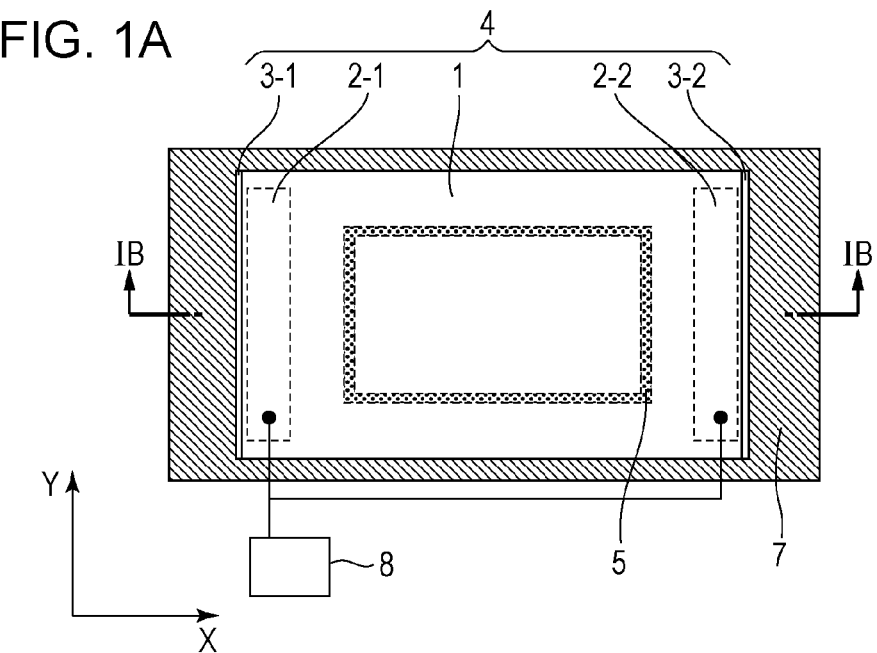
FIGS. 1A, 1B and 1C illustrate, in schematic diagrams, configurations of a dust removing device and an image pickup unit of a first embodiment.
Figure 1B:
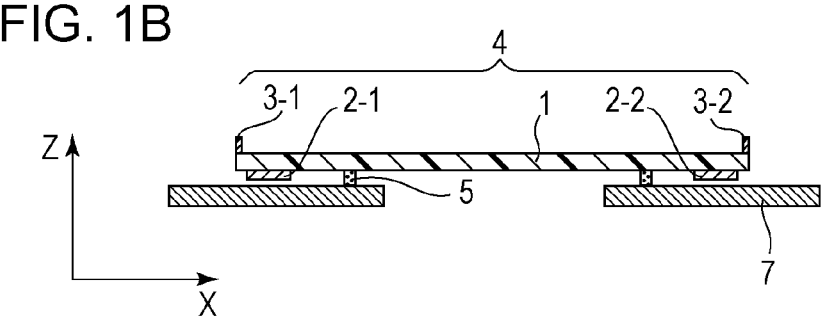
Figure 1C:
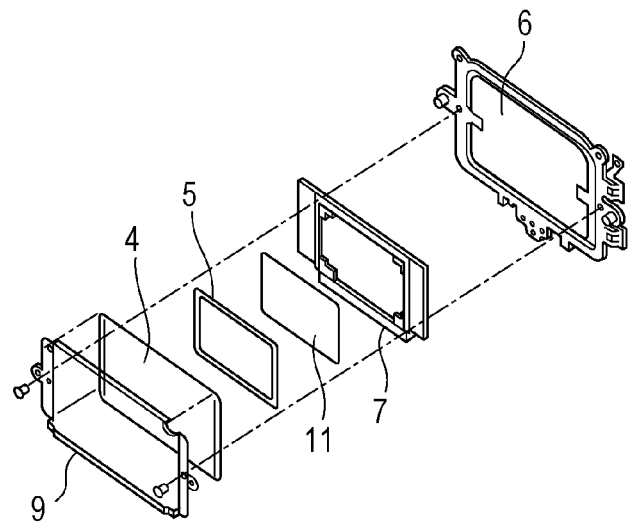

FIGS. 1A, 1B and 1C illustrate, in schematic diagrams, a configuration of a dust removing device of a first embodiment. FIG. 1A is a schematic diagram of the dust removing device seen from the Z direction and FIG. 1B is a sectional view along line IB-IB seen from the Y direction. FIG. 1C is a perspective view illustrating a configuration of an image pickup unit which incorporates the dust removing device.

The dust removing device of the present embodiment is formed by an oscillation body 4 which is provided with an optical member 1 which is an elastic member, piezoelectric elements 2-1 (a first electromechanical energy conversion element) and 2-2 (a second electromechanical energy conversion element) which are electromechanical energy conversion elements, and rigidity-increasing members 3-1 and 3-2. Alternating voltage is applied to the piezoelectric elements 2-1 and 2-2 by a driving circuit 8. The piezoelectric elements 2-1 and 2-2 will be referred to as piezoelectric elements 2 if there is no need to distinct them. Similarly, the rigidity-increasing members 3-1 and 3-2 will be referred to as rigidity-increasing members 3. In the present embodiment, the optical member 1 which is an elastic member is used as an oscillating member of the dust removing device. The piezoelectric elements 2 and the rigidity-increasing members 3 are fixed to each of longitudinal direction ends of the optical member 1 and together constitute the oscillation body 4. The rigidity-increasing members 3 of the present embodiment are provided in the optical member 1 on the surface opposite to the surface on which the piezoelectric elements 2 are provided. In the present embodiment, each of multiple node lines of oscillation in a main oscillation mode (which is an oscillation mode for the removal (falling) of dust) is oriented in the Y direction. The multiple node lines of oscillation in the main oscillation mode are parallel to one another along the X direction.

In the present invention, the image pickup unit at least includes the oscillation body 4, a support member 5 and a holding member 7 as illustrated in FIGS. 1B and 1C. The support member 5 is fixed to the optical member 1. Although the optical member 1 is held by the holding member 7 via the support member 5 in FIG. 1B, another optical member 11, such as an optical low pass filter, may be provided in the optical member at the image pickup element 6 side if needed as illustrated in FIG. 1C. If another optical member 11 is provided in the optical member 1 at the image pickup element 6 side, it is desirable to seal between the optical member 1 and another optical member 11 by the support member 5 as illustrated in FIG. 1C. Desirably, the image pickup unit is preferred with an urging member 9. The urging member 9 urges the optical member 1 toward the image pickup element.

Rigidity-Increasing Member

The rigidity-increasing members 3 are made of a material with relatively high, such as a metallic material, of which longitudinal elastic modulus (i.e., the Young's modulus) is preferably 10 GPa or greater and more preferably 50 GPa or greater. Examples of the material include metallic materials, such as iron, copper, aluminum and zinc, and alloys, such as brass and stainless steel.

Desirably, the width (i.e., the length in the direction perpendicular to the node line in the main oscillation mode) of the rigidity-increasing members is not greater than ½ of a wavelength of the higher-order oscillation mode among the main oscillation mode which is the oscillation mode for the removal of dust. The main oscillation mode will be described below. For example, if the 10th-order bending oscillation mode and the 11th-order bending oscillation mode are used as the main oscillation modes, it is desirable that the width of the rigidity-increasing members is not greater than ½ of the wavelength in the 11th-order bending oscillation mode. It is desirable that the length (i.e., the length in the direction of the node line in the main oscillation mode) of the rigidity-increasing members is not less than ½ of the wavelength of an unnecessary oscillation mode which is an oscillation mode in which falling of dust is disturbed. The unnecessary oscillation mode will be described in detail below. Since the rigidity-increasing members have the above-described dimension, oscillation in the unnecessary oscillation mode can be reduced while oscillation in the main oscillation mode is not disturbed.

Desirably, the rigidity-increasing members are provided at locations at which distortion in the X direction (i.e., the direction perpendicular to the node line in the main oscillation mode within a surface of the elastic body) of the optical member 1 due to oscillation in main oscillation mode is zero. It is more desirable that the rigidity-increasing members are provided at locations at which out-of-surface displacement of the elastic body (i.e., displacement in the Z direction) is also zero. In the present invention, the term distortion is "zero" indicates not only complete zero but also ¼ or smaller of the maximum distortion. The term out-of-surface displacement (displacement in the Z direction) is "zero" indicates not only complete zero but also ¼ or smaller of the maximum displacement. Desirably, the rigidity-increasing members are located in the optical member 1 at least at the center (i.e., the center in the Y direction) in the direction of the node line in the main oscillation mode. Since the rigidity-increasing members are located at the above-described positions, oscillation in the unnecessary oscillation mode can be further reduced while oscillation in the main oscillation mode is not disturbed.

Although two rigidity-increasing members 3 are provided in the present embodiment, the number of the rigidity-increasing members 3 may be one or three or larger. The rigidity-increasing members 3 may be provided on the piezoelectric elements 2 instead of on the optical member 1.

Optical Member

The optical member 1 is an elastic member which excites oscillation, and is made of an optical member with high transmittance, such as cover glass, an infrared ray cut filter or an optical low pass filter. Photographing light beams having passed through the optical member 1 enter the image pickup element 6.

Support Member

The support member 5 is fixed to the optical member 1 with an adhesive to relatively align the holding member 7 and the optical member 1 and supports the optical member 1. The support member 5 prevents ingression of dust from outside into an optical path between the optical member 1 and the holding member 7. If another optical member 11 is provided between the optical member 1 and the image pickup element 6, the support member 5 may seal between the optical member 1 and the optical member 11. The support member is made of an elastic member, such as felt, foamed resin, such as urethane foam, and rubber. Desirably, the support member is flexible (i.e., having the Young's modulus of not higher than 0.1 GPa) and functions as an oscillation absorbing member which absorbs oscillation of the optical member 1.

Holding Member

Although the holding member 7 holds the optical member 1 in the present invention, the holding member 7 may hold the optical member 1 via the optical member 11 if another optical member 11, which is different from the optical member 1, is provided.

Urging Member

The urging member 9 applies urging force to the optical member 1 toward the image pickup element 6. In particular, the urging member 9 is made of material having spring property, such as metal, as a single member. Four corners, in the vicinity of oscillation nodes in the main oscillation mode, of the optical member 1 are fixed to four corners of the urging member 9.

Driving Method

Next, alternating voltage applied to the piezoelectric elements and oscillation generated in the optical member will be described. When alternating voltage is applied to the piezoelectric elements 2 by the driving circuit 8 illustrated in FIG. 1A, the piezoelectric elements stretch in an in-surface direction due to an inverse piezoelectric effect. Therefore, the optical member 1, joined with the piezoelectric elements 2, receives stretching force from the piezoelectric elements 2 in the in-surface direction on the joining surface. As a result, standing wave oscillation which periodically changes asperity of the optical member 1 on the joining surface side with the piezoelectric elements 2 is produced.

Figure 2:
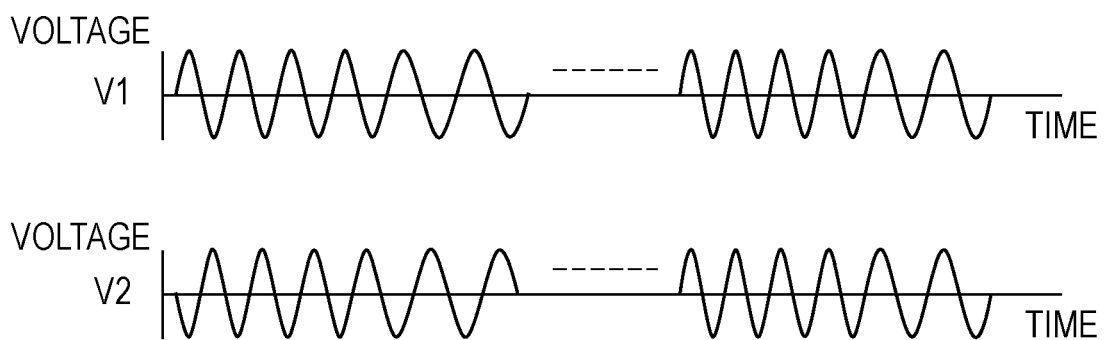
FIG. 2 is a graph of alternating voltage applied to piezoelectric elements of the dust removing device of the first embodiment.

Examples of alternating voltage applied to each of the piezoelectric elements when exciting standing wave oscillation in a configuration in which two piezoelectric elements are provided at both ends of the optical member 1 as in the present embodiment are illustrated in FIG. 2. The upper diagram of FIG. 2 represents alternating voltage V1 applied to the piezoelectric element 2-1 illustrated in FIG. 1A and the lower diagram represents alternating voltage V2 applied to the piezoelectric element 2-2. The vertical axis represents voltage and the horizontal axis represents time.

In the present embodiment, an example in which the 10th-order bending oscillation mode (a first oscillation mode) in the X direction and the 11th-order bending oscillation mode (a second oscillation mode) in the X direction are used as the main oscillation modes for the removal of dust will be described. In order to excite oscillation in these two oscillation modes alternately, alternating voltage having the frequency around the natural frequency of the 10th-order bending oscillation mode of the oscillation body 4 and having 180 degrees different phases is first applied to the piezoelectric elements 2-1 and 2-2. Application of such alternating voltage excites the 10th-order bending oscillation mode in the oscillation body 4. After the 10th-order bending oscillation mode is continuously excited for predetermined period of time, alternating voltage having the frequency around the natural frequency of the 11th-order bending oscillation mode of the oscillation body 4 and having the same phase is first applied to the piezoelectric elements 2-1 and 2-2. Application of such alternating voltage excites the 11th-order bending oscillation mode in the oscillation body 4. Repeating the driving described above excites oscillation of the 10th- and 11th-order bending oscillation modes. Desirably, the frequency of alternating voltage is gradually swept from the high frequency side toward the low frequency side around the natural frequency at the time of such driving as illustrated in FIG. 2. When the frequency of alternating voltage is around the natural frequency of the oscillation body 4, an increased amplitude is provided efficiently even with small application voltage.

Figure 3A:
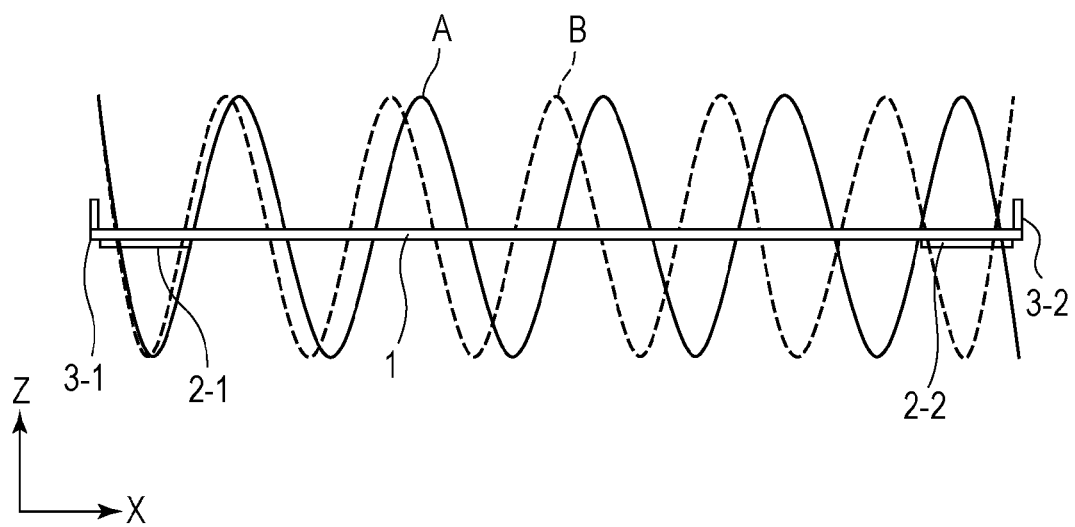
FIG. 3A illustrates, in a schematic diagram, displacement distribution in the Z direction
Figure 3B:
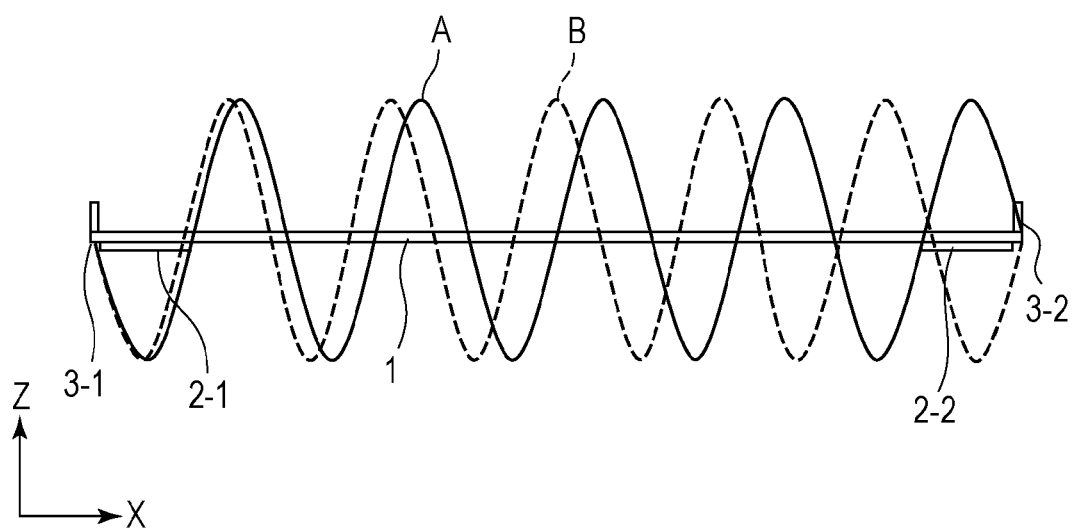
FIG. 3B illustrates, in a schematic diagram, distortion distribution in the X direction, of each oscillation mode produced in an oscillation body.
Figure 10A:
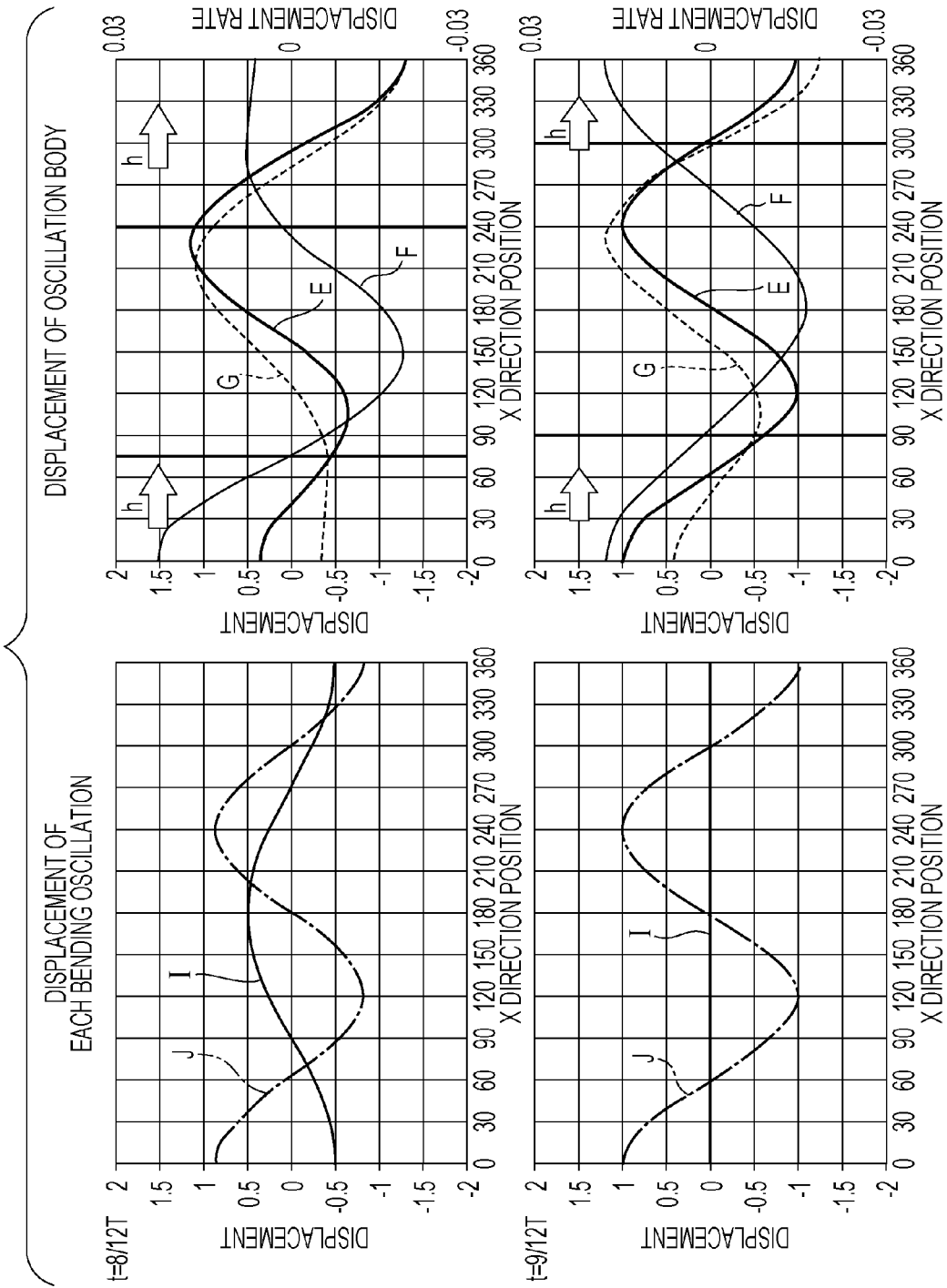
Figure 11:
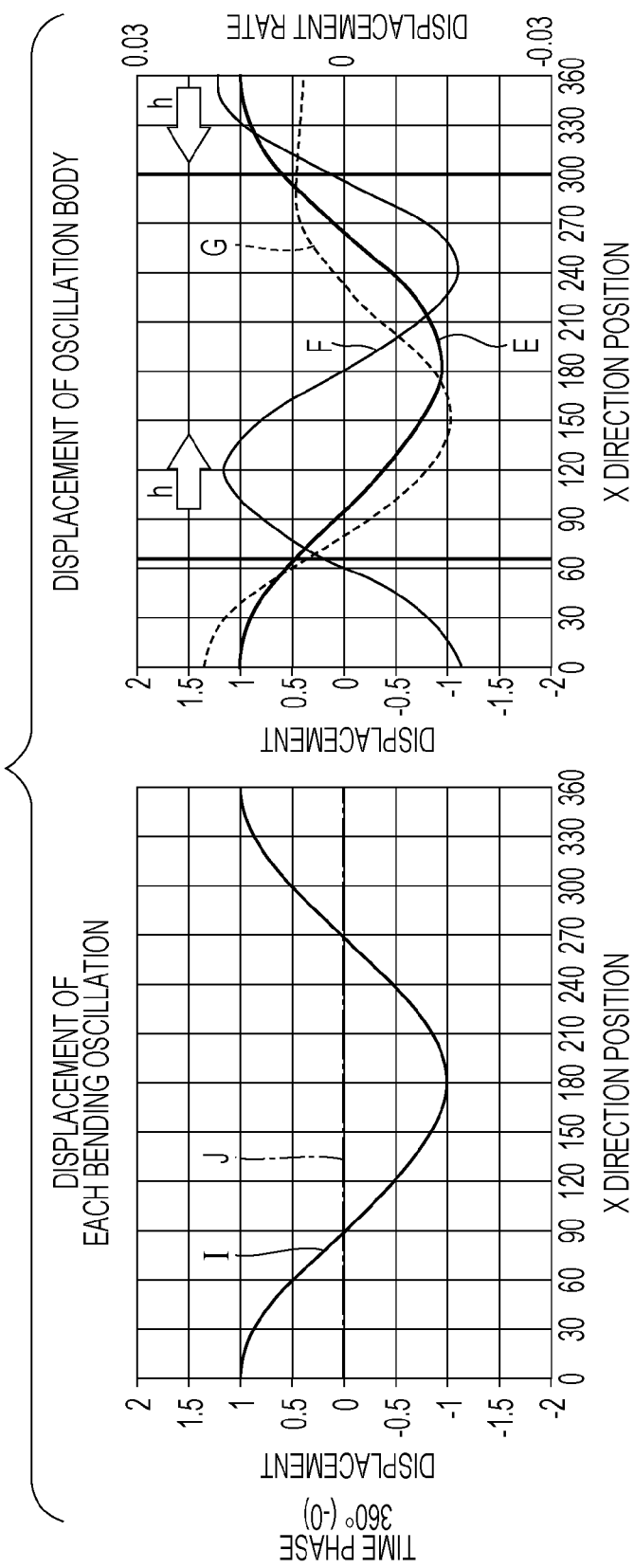
FIG. 11 illustrates graphs of each bending oscillation and displacement of the oscillation body in each time phase.

FIG. 3A illustrates displacement distribution in the Z direction of oscillation in the main oscillation mode excited in the oscillation body 4 by the piezoelectric elements 2 in the optical member 1 on the surface opposite to the surface on which the piezoelectric elements 2 are provided, and illustrates a positional relationship of the piezoelectric elements 2 and the rigidity-increasing members 3. FIG. 3B illustrates distortion distribution in the X direction of oscillation in the main oscillation mode in the optical member 1 on the surface opposite to the surface on which the piezoelectric elements 2 are provided, and illustrates a positional relationship of the piezoelectric elements 2 and the rigidity-increasing members 3. In FIGS. 3A and 3B, 10th-order bending oscillation mode is represented by a solid line (A) as the first oscillation mode and the 11th-order bending oscillation mode is represented by a dashed line (B) as the second oscillation mode.

The first oscillation mode A and the second oscillation mode B are out-of-surface bending oscillation modes in which the oscillation body 4 is bent and deformed in the thickness direction of the optical member 1. When alternating voltage described above is applied to the piezoelectric elements 2, oscillation in the first oscillation mode A and in the second oscillation mode B is sequentially transmitted to the oscillation body 4. In the first oscillation mode A, the waveform is lowest at the left end and is highest at the right end. Therefore, since the different in phase of alternating voltage to be applied to the piezoelectric elements 2-1 and 2-2 is 180 degrees as described above, an increased amplitude is obtained. In the second oscillation mode B, on the contrary, the waveform is lowest at both the left and right ends. Therefore, since the different in phase of alternating voltage to be applied to the piezoelectric elements 2-1 and 2-2 is 0 degrees, an increased amplitude is obtained. The piezoelectric elements 2 are located at loop positions where oscillation displacement is large in the first oscillation mode A and in the second oscillation mode B. Thus, the piezoelectric elements 2 are capable of producing effective excitation force in the first oscillation mode A and in the second oscillation mode B.

In the present invention, oscillation in the first oscillation mode and in the second oscillation mode may be excited simultaneously. In this case, it is desirable that only one piezoelectric element 2 is provided at an end of the optical member 1 and that alternating voltage having the frequency between the natural frequency of the first oscillation mode and the natural frequency of the second oscillation mode is applied to that piezoelectric element 2.

In this manner, letting oscillation in the first oscillation mode be excited in the oscillation body 4 causes dust adhering to the optical member 1 at the loop positions of oscillation to fall. In particular, when acceleration greater than adhesive force of dust to the optical member 1 is applied to dust by oscillation in the first oscillation mode, dust is eliminated from the optical member 1. In addition, letting oscillation in the second oscillation mode be excited in the oscillation body 4 causes dust adhering to the optical member 1 in the vicinity of the nodes of oscillation to fall.

Although the 10th-order bending oscillation mode is used as the first oscillation mode and the 11th-order bending oscillation mode is used as the second oscillation mode as the minimum required oscillation modes for the removal of dust in the present embodiment, the present embodiment is not limited thereto. Additionally, oscillation in other oscillation modes (e.g., the 12th-bending oscillation mode and the 13th-bending oscillation mode) may be applied to the optical member 1.

In the oscillation body 4, many other oscillation modes exist around the natural frequency of these main oscillation modes. These oscillation modes are unnecessary oscillation modes having displacement distribution different to those of the first oscillation mode and the second oscillation mode, and therefore disturb falling of dust. Hereinafter, oscillation in the unnecessary oscillation mode according to the present invention will be described.

Figure 4A:
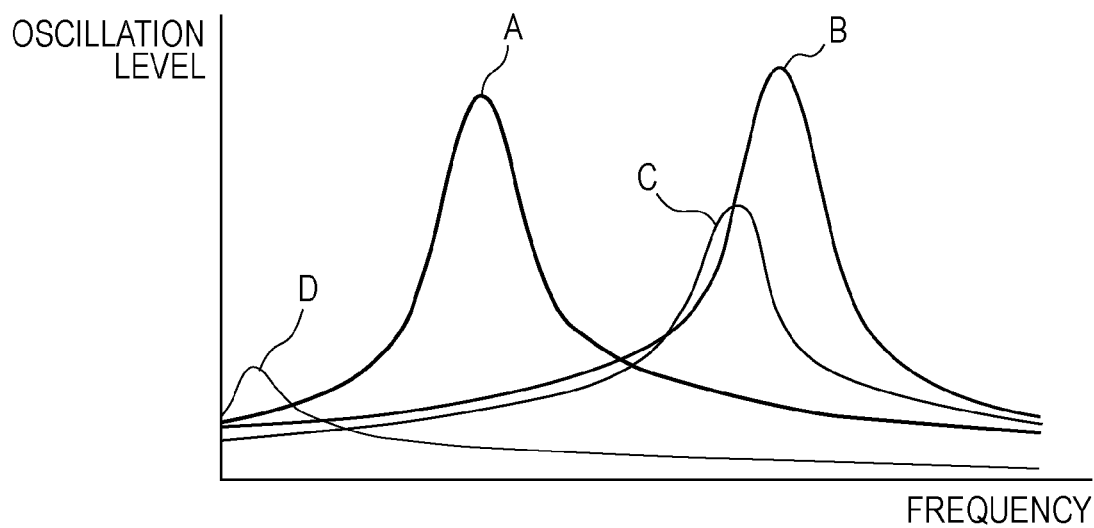
FIGS. 4A and 4B are graphs which illustrate the frequency of alternating voltage applied to the piezoelectric elements and the level of oscillation of each oscillation mode excited in the oscillation body.
Figure 4B:
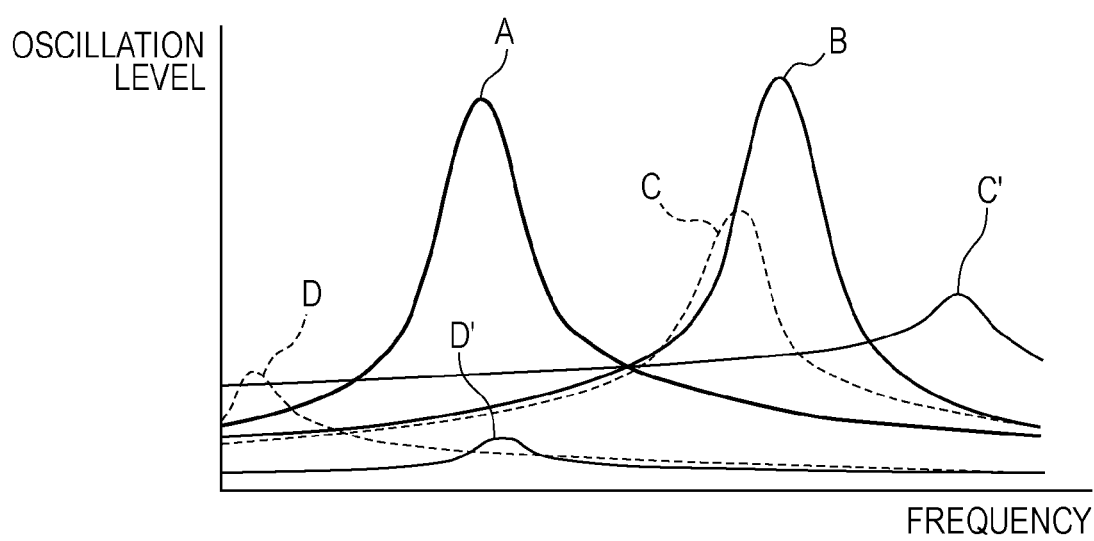

FIGS. 4A and 4B are graphs of which horizontal axis represents the frequency of alternating voltage applied to the piezoelectric elements 2 and vertical axis represents the level of oscillation in each oscillation mode. For example, the oscillation mode of C is an oscillation mode in which the order of bending in the X direction is the out-of-surface 10th-order bending deflection which is the same as that in the first oscillation mode A and the order of bending in the Y direction is the out-of-surface 1st-order bending deflection (a third oscillation mode).

Figure 5A:
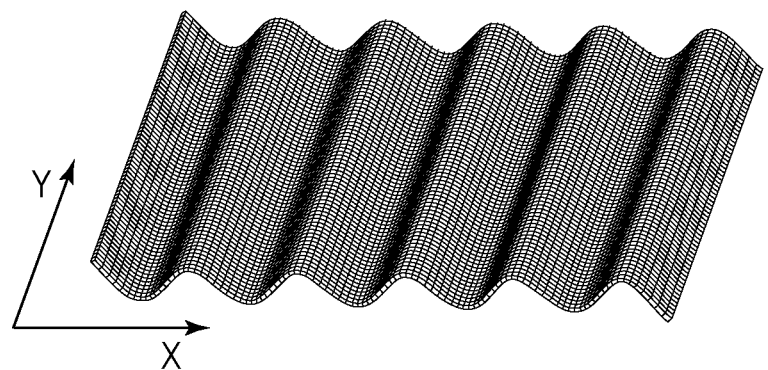
FIGS. 5A and 5B are perspective views illustrating a first oscillation mode and a second oscillation mode respectively.
Figure 5B:
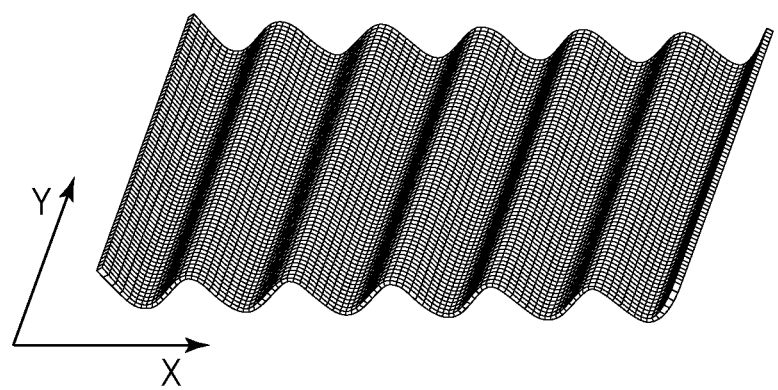
Figure 6A:
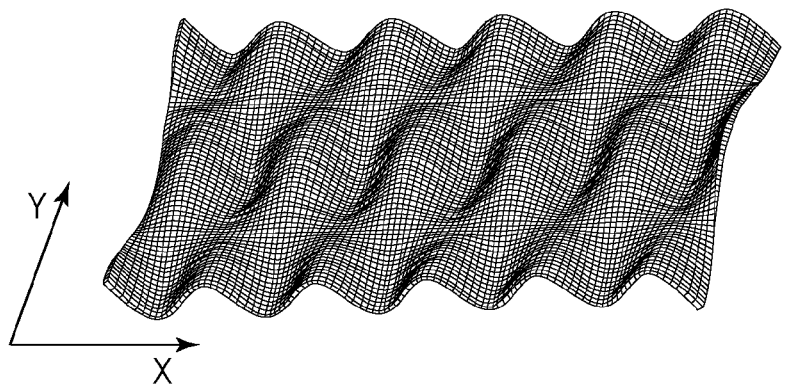
FIGS. 6A to 6D are perspective views illustrating a third oscillation mode and a fourth oscillation mode respectively.
Figure 6B:
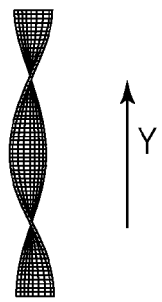

Here, a deformed shape of the optical member 1 in the first oscillation mode is illustrated, in a perspective view, in FIG. 5A and a deformed shape of the optical member 1 in the second oscillation mode is illustrated, in a perspective view, in FIG. 5B. FIG. 6A illustrates, in a perspective view, a deformed shape of the optical member 1 in the third oscillation mode and FIG. 6B is a diagram seen from the X direction of FIG. 6A.

In the third oscillation mode, the optical member 1 deforms also in the Y direction in addition to deformation in the first oscillation mode. For this reason, the third oscillation mode has the natural frequency slightly higher than that of the first oscillation mode. If no rigidity-increasing member 3 is provided, oscillation in the third oscillation mode is especially large among other unnecessary oscillation modes.

The reason that oscillation in the third oscillation mode is especially large is discussed here. As described above, in order to excite oscillation in the first oscillation mode and in the second oscillation mode, alternating voltage is applied to the piezoelectric elements 2 to produce stretching force in the X direction, whereby bending deflection force in the X direction is produced in the oscillation body 4. The piezoelectric elements 2 are located at loop positions where oscillation displacement is large in the first oscillation mode A and in the second oscillation mode B as illustrated in 3A. Thus, the piezoelectric elements 2 are capable of producing effective excitation force in the first oscillation mode A and in the second oscillation mode B.

Similarly, the piezoelectric elements 2 are located at loop positions where oscillation displacement is large in the third oscillation mode C. For this reason, oscillation in the third oscillation mode C is large. In the piezoelectric elements 2, since the Y direction is also perpendicular to the polarization direction, stretching force is produced also in the Y direction, thereby producing excitation force to bend the oscillation body 4. The third oscillation mode C is an oscillation mode which produces bending deflection in the Y direction. For this reason, oscillation in the third oscillation mode is further increased.

On the contrary, if the rigidity-increasing members 3 are provided as in the case of the present invention, the bending rigidity in the Y direction of the oscillation body 4 is large. Since the rigidity-increasing members 3 are provided to extend between the ends in the Y direction of the optical member 1 as in the case of the present embodiment, the effect of increasing bending rigidity in the Y direction of the oscillation body 4 is enhanced and which is desirable. Increased bending rigidity in the Y direction can reduce oscillation in the third oscillation mode which has bending deflection in the Y direction. At the same time, the natural frequency of the third oscillation mode is high. That is, since the rigidity-increasing members 3 are provided, the curve representing (the level of) oscillation response to the frequency in the third oscillation mode C is C-C' as illustrated in FIGS. 4A and 4B, which higher than the natural frequency of the second oscillation mode.

The rigidity-increasing members 3 are provided at positions where distortion in the X direction is zero as illustrated in FIG. 3B; and thus rigidity in the X direction hardly increases. That is, oscillation in the first oscillation mode A and in the second oscillation mode B having no bending deflection in the Y direction is difficult to reduce. The natural frequency of the first oscillation mode A and in the second oscillation mode B hardly change as illustrated in FIGS. 4A and 4B.

Figure 6C:
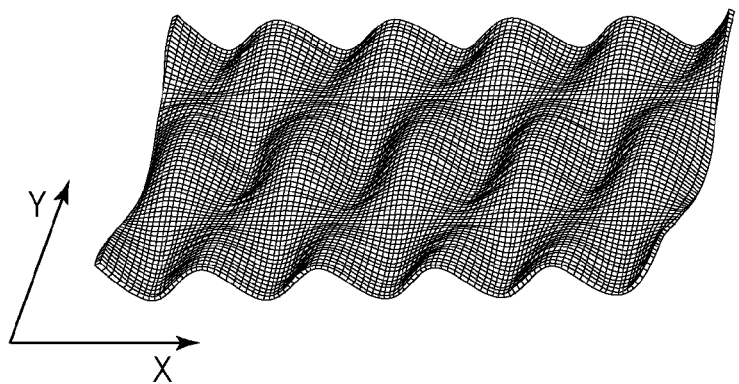
Figure 6D:
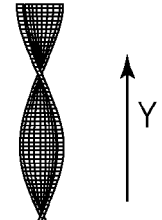

Similarly, oscillation modes having bending deflection in the X direction and in the Y direction other than the third oscillation mode have the increased natural frequency. For example, the oscillation mode of D illustrated in FIG. 4A is an oscillation mode having bending order in the X direction being the out-of-surface the 9th-order bending deflection which is smaller in number than that in the first oscillation mode A and having out-of-surface 1st-order bending deflection in the Y direction (a fourth oscillation mode). FIG. 6C illustrates a deformed shape of the optical member 1 in the fourth oscillation mode D and FIG. 6D illustrates a deformed shape seen from X direction of 6C.

Depending on the longitudinal elastic modulus or the dimension of the rigidity-increasing members 3, oscillation modes, such as fourth oscillation mode D, having the natural frequency which is originally far from that of the first oscillation mode A and the second oscillation mode B sometimes have the natural frequency which is close to that of the first oscillation mode A or the second oscillation mode B. Since the rigidity-increasing members 3 are provided, the curve representing oscillation response to the frequency in the fourth oscillation mode D is D-D' as illustrated in FIGS. 4A and 4B.

However, since the fourth oscillation mode D originally has a smaller-order of bending in the X direction and the positions of the piezoelectric elements 2 are separated from the loop positions where oscillation displacement is large, smaller excitation force is produced. Therefore, since oscillation in the fourth oscillation mode D' after the rigidity-increasing members 3 are provided is smaller as compared with that in the third oscillation mode C, the influence of oscillation in the fourth oscillation mode D' over the first oscillation mode A and the second oscillation mode B is restrictive.

According to the present embodiment, as described above, in the dust removing device which removes dust adhering to the optical member 1 by means of oscillation, the rigidity-increasing members 3 which increase rigidity of the optical member 1 in the direction of the node line of oscillation in the main oscillation mode for the removal of dust are provided in either of the optical member 1 or the piezoelectric elements 2. As a result, oscillation in the unnecessary oscillation mode is reduced. Since the rigidity-increasing members 3 are provided at positions at which distortion in the X direction of the optical member 1 due to oscillation in the main oscillation mode is zero, it is possible to reduce oscillation in the unnecessary oscillation mode while hardly disturbing oscillations in the main oscillation mode. The natural frequency of the unnecessary oscillation mode can be separated from the natural frequency of the main oscillation mode. In particular, it is possible to shift the natural frequency of the unnecessary oscillation mode to the high frequency side.

As a result, an increased amount of dust adhering to the optical member 1 can be removed because an influence of oscillation in the unnecessary oscillation mode over oscillation in the main oscillation mode is restrictive. Although the third oscillation mode which has the out-of-surface 1st-order bending deflection in the Y direction has been described as the unnecessary oscillation mode in the present embodiment, the effect of the present invention is not limited only to the reduction in this oscillation mode; the present invention is effective in all the oscillation modes (e.g., the 2nd-bending oscillation mode and 3rd-bending oscillation mode) which have out-of-surface bending deflection in the Y direction (which is the direction of nodes in the oscillation in the main oscillation mode).

Second Embodiment

The present embodiment has the same configuration as the first embodiment (see FIGS. 1A to 1C) except for the driving method; therefore, description of the configuration will be omitted.

Figure 7:
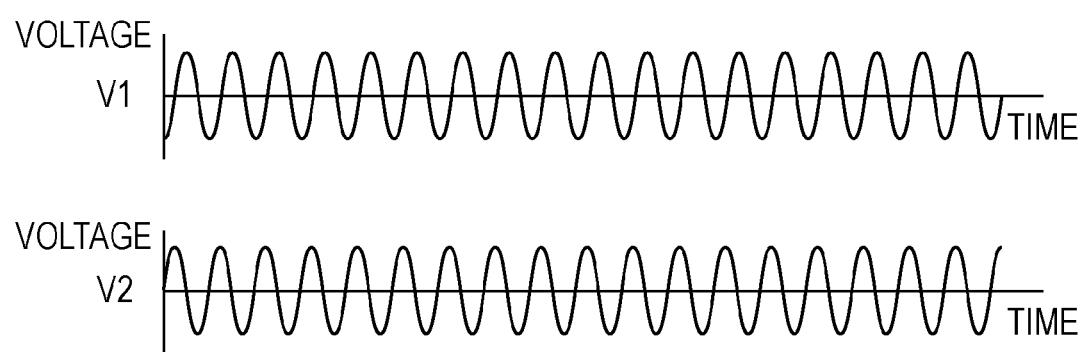
FIG. 7 is a graph of alternating voltage applied to piezoelectric elements of a dust removing device of a second embodiment.

FIG. 7 is a graph of alternating voltage applied at the time of driving the present embodiment. In the present embodiment, alternating voltage V1 is applied to a piezoelectric element 2-1, and alternating voltage V2 is applied to a piezoelectric element 2-2. Alternating voltage V1 and alternating voltage V2 have cycle frequency having a response to a resonance phenomenon of m-th-bending oscillation (m is a natural number) as oscillation in a first oscillation mode and (m+1)-th bending oscillation as oscillation in a second oscillation mode. Alternating voltage V1 and alternating voltage V2 differ from each other in the time phase (the phase difference is 90 degrees in FIG. 7, the phase difference is not limited thereto but V1 and V2 may be of any different phases). These alternating voltages V1 and V2 excite composite oscillation in the oscillation body 4. The composite oscillation constituted by the m-th out-of-surface bending oscillation and the (m+1)-th out-of-surface bending oscillation which are different in time phase.

Here, a case in which m=1 will be described. FIGS. 8A to 11 each illustrate graphs of oscillation in the 1st-order bending oscillation mode and oscillation in the 2nd-order bending oscillation mode in a case in which the difference in time phase is 90 degrees and the amplitude is 1:1 and graphs of normalized values of displacement and a displacement rate of the oscillation body in the Z direction caused by the overlap of these oscillations at each time phase t (cycle of oscillation here is T). The vertical axis represents displacement and the displacement rate in the Z direction, in which the side of the piezoelectric elements 2 is negative. The horizontal axis represents a position when the length in the X direction of the oscillation body 4 is 360.

In FIGS. 8A to 11, a waveform I represents displacement of the 1st-order out-of-surface bending oscillation which is the first oscillation mode. A waveform J represents displacement of the 2nd-order out-of-surface bending oscillation which is the second oscillation mode. A waveform E represents displacement of the oscillation body 4 caused by the overlap of these oscillations. A waveform G represents displacement of the oscillation body 4 before the time phase 1/12T of the waveform E. A waveform F represents the displacement rate in the oscillation body 4.

Figure 8A:
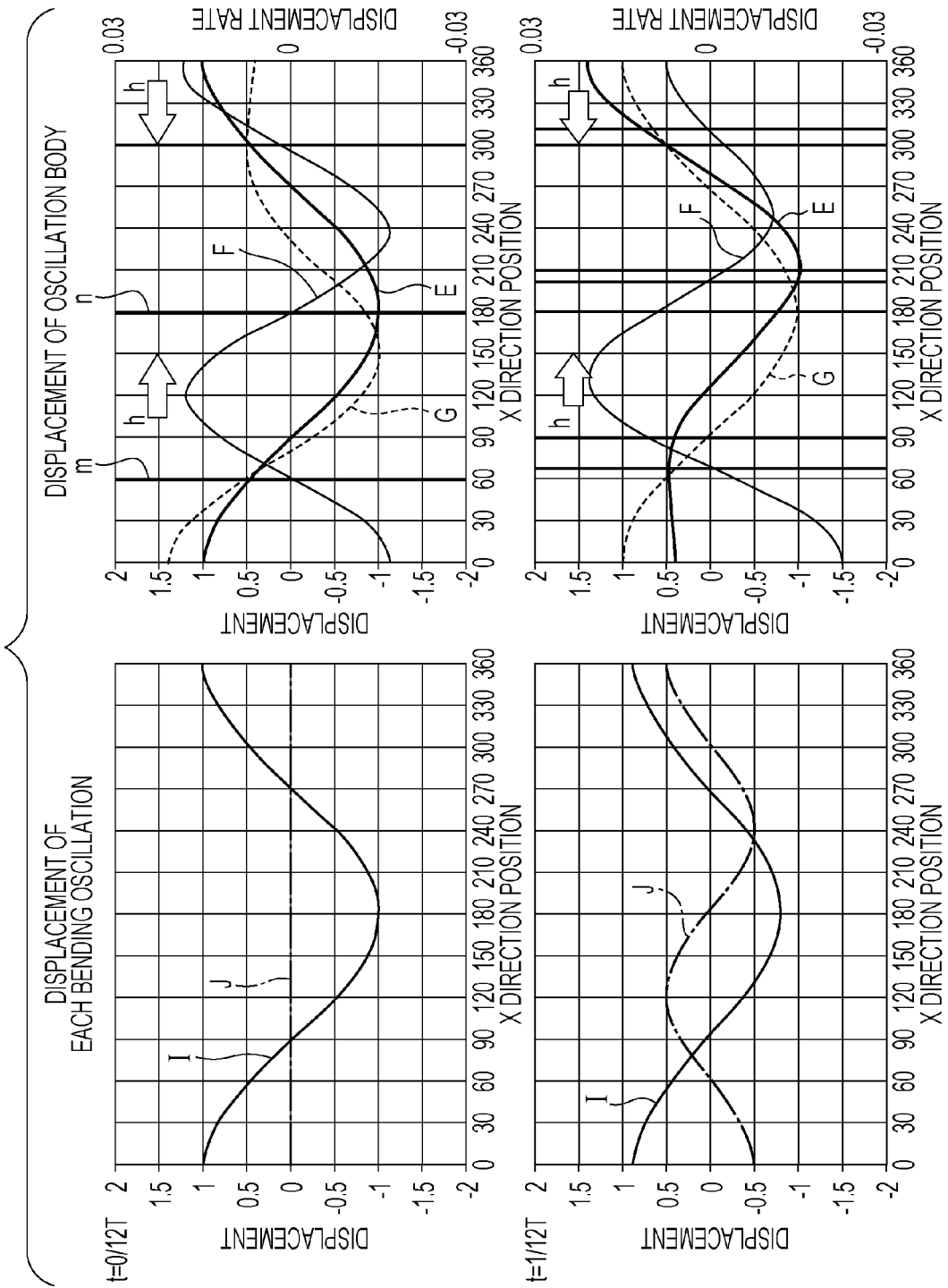
Figure 9A:
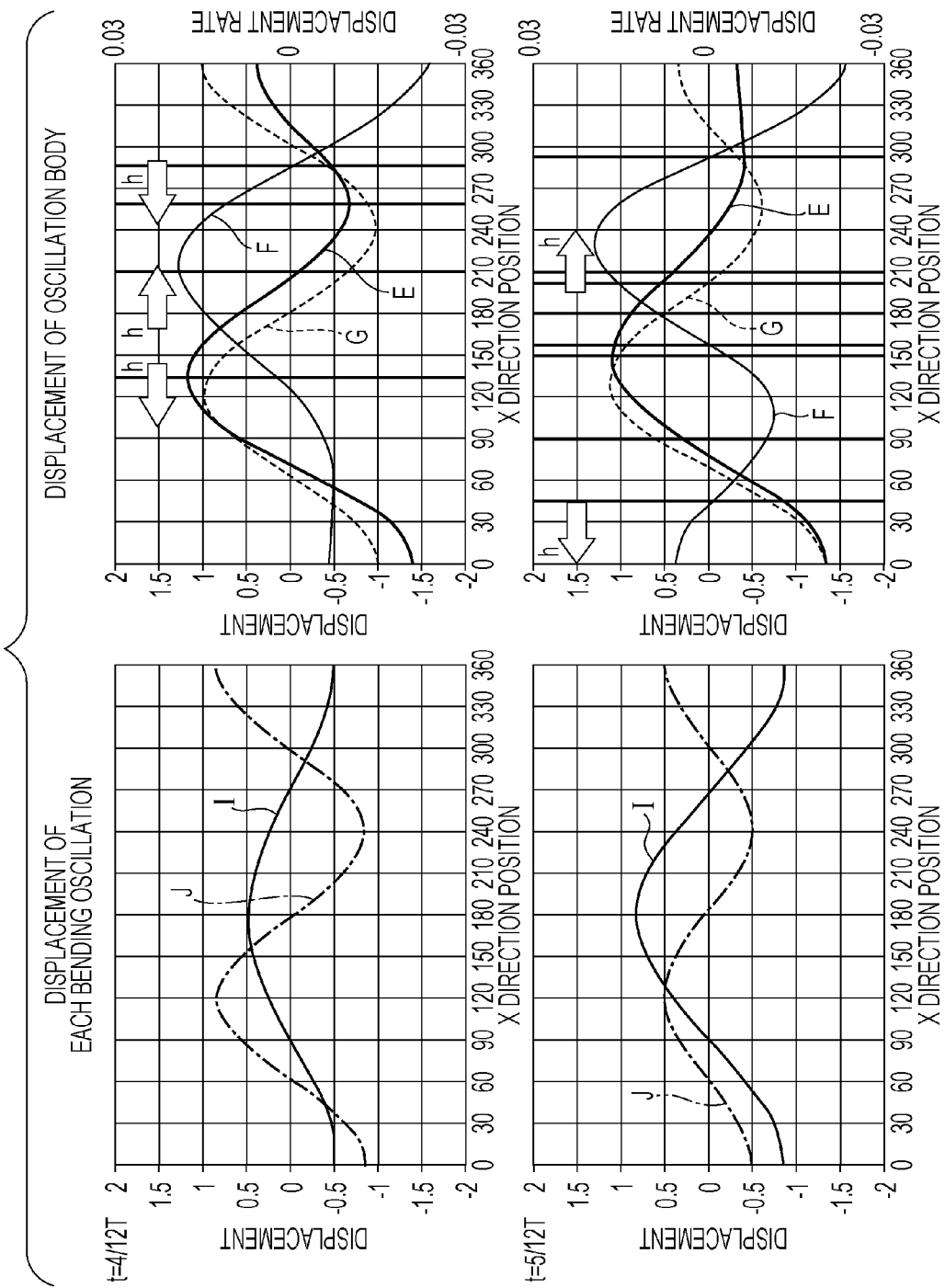
FIGS. 9A and 9B illustrate graphs of each bending oscillation and displacement of the oscillation body in each time phase.
Figure 9B:
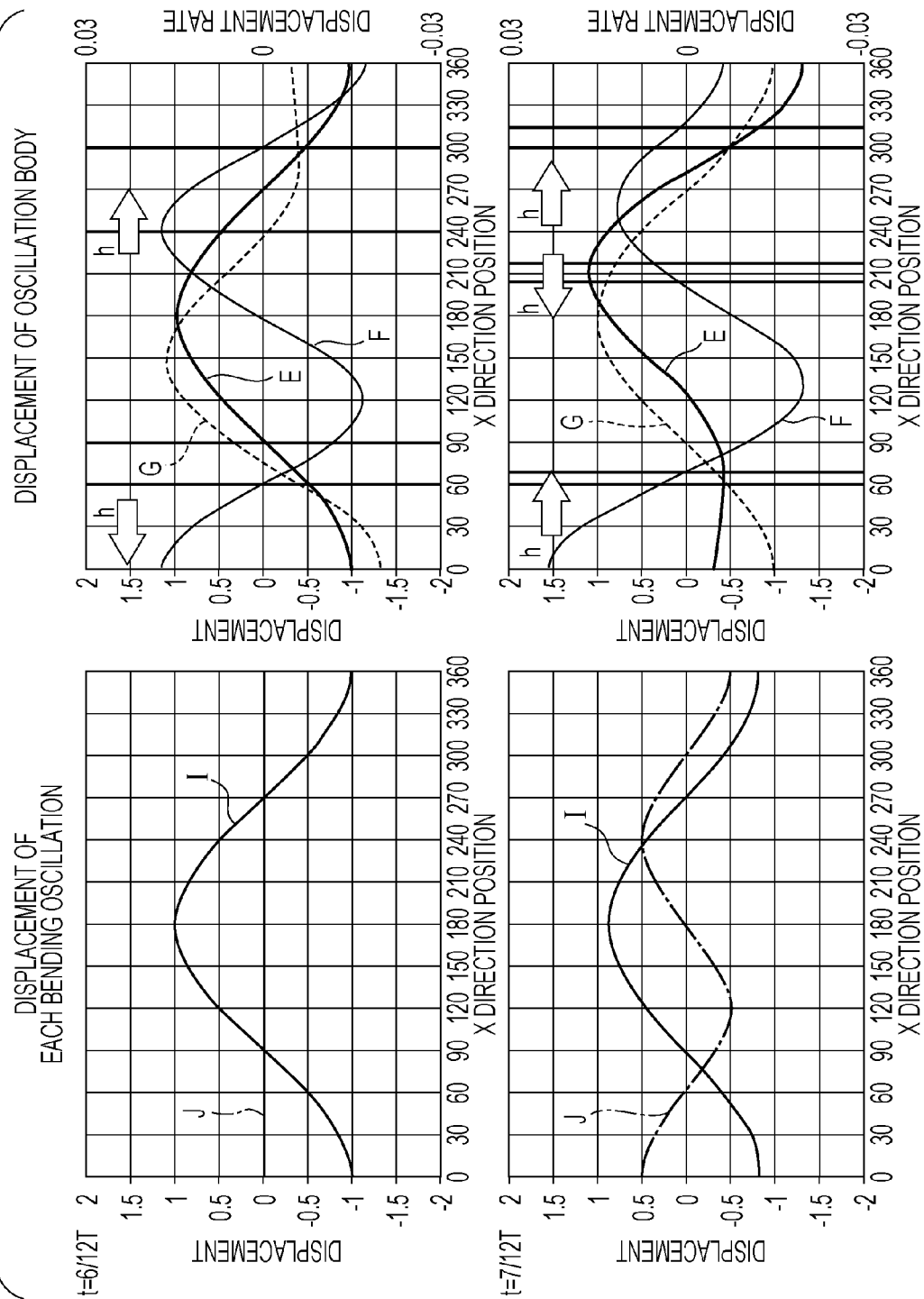

During operation of the dust removing device, dust adhering to a surface of the optical member 1 receives normal direction force of the surface of the optical member 1 to be popped and displaced when the optical member 1 hits dust upward in the out-of-surface direction (i.e., the positive direction on the vertical axis in FIGS. 8A to 11). In particular, in each time phase, when the waveform F representing the displacement rate is a positive value, dust is hit upward in the out-of-surface direction and is displaced while receiving normal direction force of the waveform E representing displacement of the oscillation body 4 in this time phase. Arrows h in FIGS. 8A to 11 represent the directions in which dust is displaced. For example, the left arrows h in FIGS. 8A and 8B are X components in the normal direction of the waveform E and represent the direction in which dust is displaced in the section between positions m and n at which the waveform F is a positive value.

In FIGS. 8A to 11, in one cycle frequency in a section between positions 60 to 300 of the optical member 1, an amount of oscillation which lets dust be displaced in the positive direction on the horizontal axis is significantly larger than an amount of oscillation which lets dust be displaced in the negative direction on the horizontal axis. It is therefore possible to let dust be displaced in the positive direction on the horizontal axis. If an effective area of the optical member 1 to an image pickup element 6 is in the range between the position 60 and the position 300, it is possible to remove dust from the effective area.

The effect described above is not limited to the case in which m=1; but, for example, composite oscillation may be excited using the 10th-order oscillation mode as the first oscillation mode and the 11th-order oscillation mode as the second oscillation mode described in the first embodiment. The difference in order between the first oscillation mode and the second oscillation mode is not limited to one but may be two or more.

In the driving method of the present embodiment, driving is performed at the frequency between the natural frequency of the first oscillation mode and the natural frequency of the second oscillation mode. That is, since driving is performed at the frequency other than the resonance frequency, if an unnecessary oscillation mode, such as the third oscillation mode C illustrated in FIG. 4A, exists, the influence of oscillation of the unnecessary oscillation modes is larger than that in the first embodiment.

In particular, if such an unnecessary oscillation mode exists, there may be positions at which the in-surface direction is inverted when the optical member 1 hits dust adhering thereon upward in the out-of-surface direction or positions at which the in-surface direction component is small. As a result, in some locations, dust cannot be displaced between opposing in-surface directions or the efficiency with which dust is displaced becomes low due to reduced displacement force with respect to adhesive force of dust.

Then, since the rigidity-increasing members 3 are provided, oscillation in the third oscillation mode which is the unnecessary oscillation mode disturbing the falling of dust can be reduced without disturbing the oscillation in the first oscillation mode and in the second oscillation mode which are the main oscillation modes. The natural frequency of the third oscillation mode can be separated from the natural frequency of the first oscillation mode and of the second oscillation mode. In particular, it is possible to shift the natural frequency of the third oscillation mode to the high frequency side such that the natural frequency of the third oscillation mode does not exist between the natural frequency of the first oscillation mode and the natural frequency of the second oscillation mode. As a result, the influence of the third oscillation mode over the first oscillation mode and the second oscillation mode is reduced.

As described above, of the present embodiment, by letting the first oscillation mode and the second oscillation mode having different orders in which multiple node lines are arranged in the same direction be produced and composed with phase difference in the oscillation body 4, dust can be displaced and thereby an increased amount of dust can be removed.

Third Embodiment

Figure 12A:
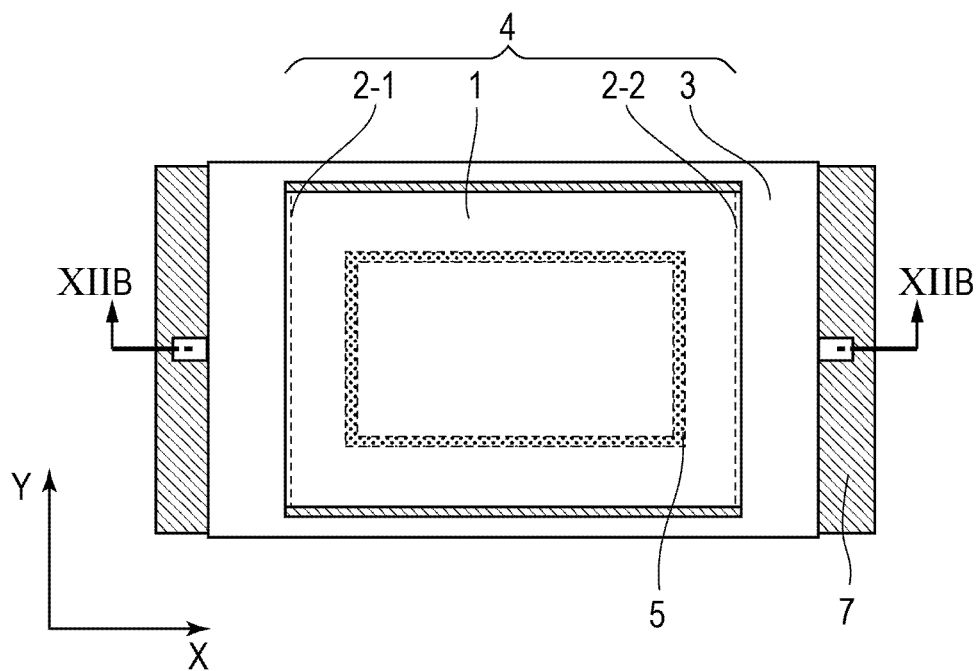
FIGS. 12A and 12B illustrate, in schematic diagrams, a configuration of a dust removing device of a third embodiment.
Figure 12B:
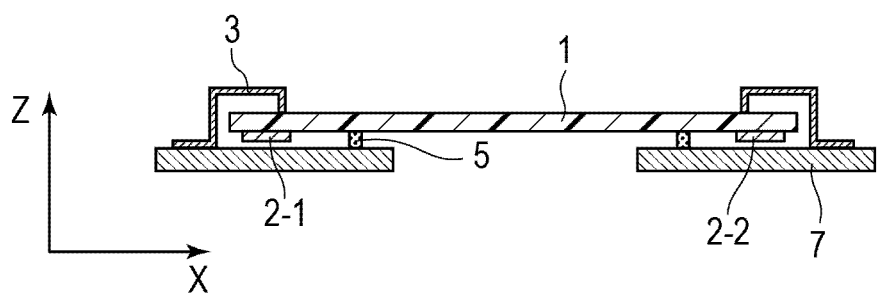

The present embodiment differs from the first embodiment in configurations of the rigidity-increasing members and the urging members. Description of configurations which are the same as those of the first embodiment will be omitted. FIGS. 12A and 12B illustrate a configuration of a dust removing device of a third embodiment of the present invention. FIG. 12A is a schematic diagram seen from the Z direction and FIG. 12B is a sectional view along line XIIB-XIIB seen from the Y direction.

As illustrated in FIGS. 12A and 12B, the dust removing device is formed by an oscillation body 4 which is provided with an optical member 1, piezoelectric elements 2-1 and 2-2 which are electromechanical energy conversion elements, and a rigidity-increasing member 3. The optical member 1 is held by a holding member 7 via a support member 5 as in the case of the first embodiment. Since configurations of the dust removing device are the same as those of the first embodiment except for the rigidity-increasing member 3, description thereof will be omitted. Similarly, since configurations of an image pickup unit are the same as those of the first embodiment except for the dust removing device and the urging member, description thereof will be omitted.

The rigidity-increasing member 3 and the optical member 1 are fixed to each other by an adhesive or other means. The rigidity-increasing member 3 urges the optical member 1 in the optical axis direction of the photographing light beam (i.e., toward an image pickup element). This means that the rigidity-increasing member 3 of the present embodiment has an additional function as the urging member 9 illustrated in FIG. 1C.

Figure 13A:
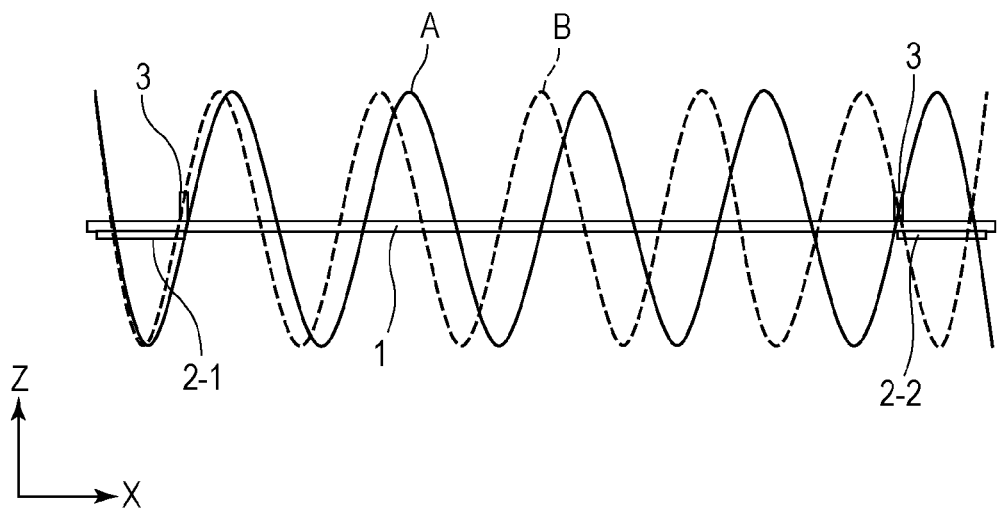
FIG. 13A illustrates, in a schematic diagram, displacement distribution in the Z direction
Figure 13B:
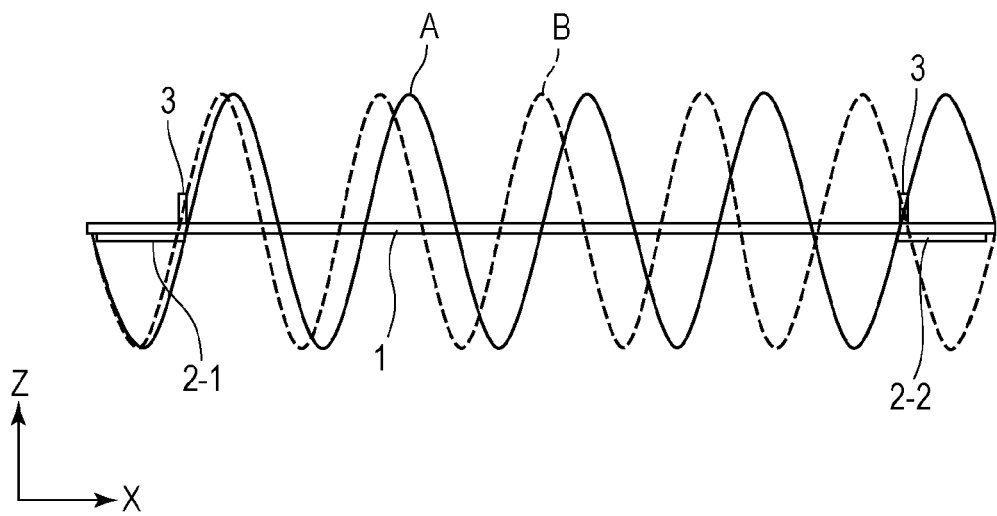
FIG. 13B illustrates, in a schematic diagram, distortion distribution in the X direction, of each oscillation mode produced in an oscillation body.

FIG. 13A illustrates displacement distribution in the Z direction of oscillation in the first and second oscillation modes excited in the oscillation body 4 by the piezoelectric elements 2 in the optical member 1 on the surface opposite to the surface on which the piezoelectric elements 2 are provided, and illustrates a positional relationship of the piezoelectric elements 2 and the rigidity-increasing member 3. FIG. 13B illustrates distortion distribution in the X direction of oscillation in the first and second oscillation modes in the optical member 1 on the surface opposite to the surface on which the piezoelectric elements 2 are provided, and illustrates a positional relationship of the piezoelectric elements 2 and the rigidity-increasing members 3.

Since the rigidity-increasing member 3 is provided at a position at which distortion in the X direction of oscillation in the first oscillation mode A and in the second oscillation mode B is zero, oscillation in the first oscillation mode A and in the second oscillation mode B hardly becomes low and thus the natural frequency hardly changes. In the present embodiment, since the rigidity-increasing member 3 is provided at a position at which displacement in the Z direction is zero, oscillation of the optical member 1 is not easily transmitted to the holding member 7 via the rigidity-increasing member 3. For this reason, an increase of loss hardly occurs and oscillation in auditory area is hard to be excited.

Since rigidity in the Y direction is increased, oscillation in the third oscillation mode which is an unnecessary oscillation mode causing out-of-surface bending deflection in the Y direction is reduced. The natural frequency of the third oscillation mode is high as in the case of the first embodiment.

As described above, of the present embodiment, since the rigidity-increasing member 3 has a function to urge the optical member 1 in addition to the function to reduce oscillation in the unnecessary oscillation mode, the dust removing device can be provided without any increase in the number of parts. The driving method of the second embodiment is applicable to the device configuration of the present embodiment.

Fourth Embodiment

Figure 14A:
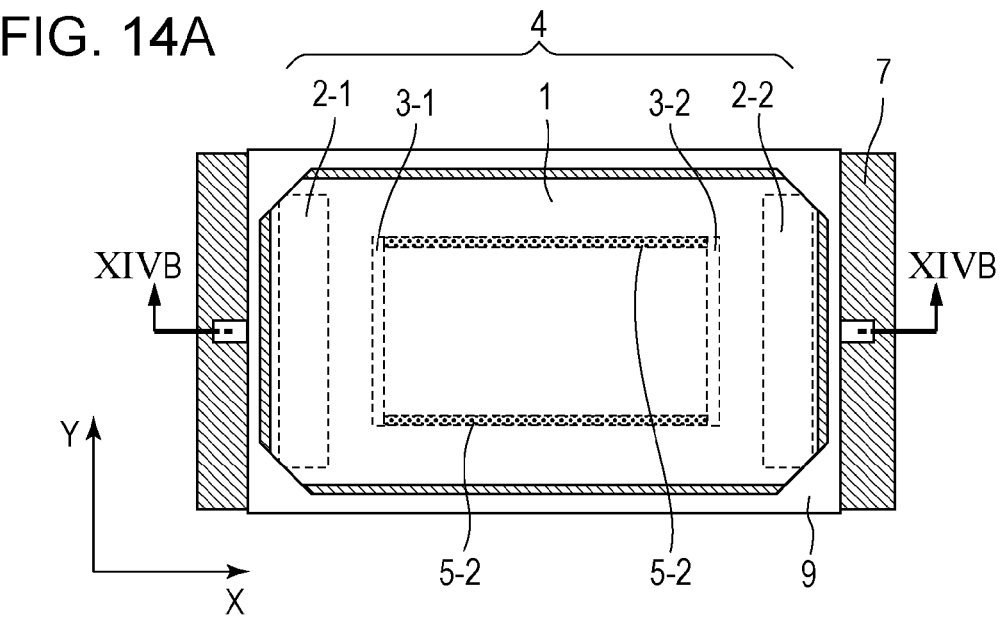
FIGS. 14A, 14B and 14C illustrate, in schematic diagrams, a configuration of a dust removing device of a fourth embodiment.
Figure 14B:
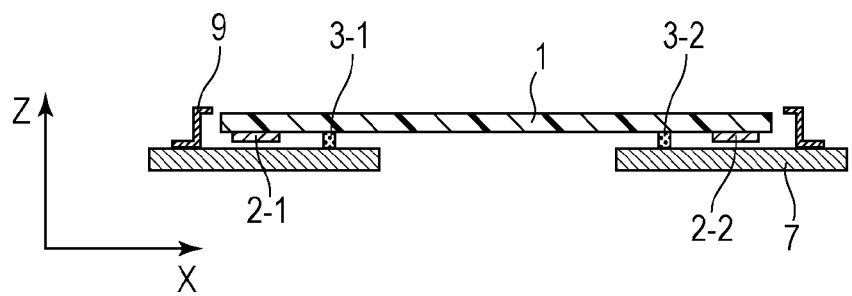
Figure 14C:
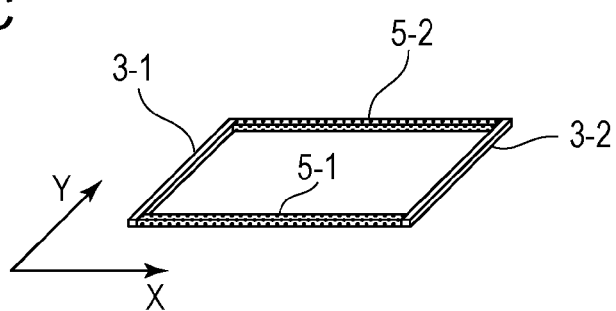

The present embodiment differs from the first embodiment in a configuration of the rigidity-increasing member. Description of configurations which are the same as those of the first embodiment will be omitted. FIGS. 14A, 14B and 14C illustrate, in schematic diagrams, a configuration of a dust removing device of a fourth embodiment. FIG. 14A is a schematic diagram seen from the Z direction of an optical member 1 and FIG. 14B is a sectional view along line XIVB-XIVB seen from the Y direction.

As illustrated in FIGS. 14A and 14B, the dust removing device is formed by an oscillation body 4 which is provided with an optical member 1, piezoelectric elements 2-1 and 2-2 which are electromechanical energy conversion elements, and rigidity-increasing members 3-1 and 3-2. Since configurations of the dust removing device are the same as those of the first embodiment except for the rigidity-increasing members 3-1 and 3-2, description thereof will be omitted. Similarly, since a configuration of an image pickup unit are the same as those of the first embodiment except for the dust removing device and the support member, description thereof will be omitted.

The rigidity-increasing members 3-1 and 3-2 are fixed between a holding member 7 and an optical member 1 by an adhesive material. The rigidity-increasing members 3-1 and 3-2 relatively align the holding member 7 and the optical member 1 and support the optical member 1.

A support member 5-1 is provided to connect upper ends of the rigidity-increasing members 3-1 and 3-2. A support member 5-2 is provided to connect lower ends of the rigidity-increasing members 3-1 and 3-2. That is, the support members 5-1 and 5-2 differ from the support member of the first embodiment in that parts of the support members parallel to the node line of oscillation in the main oscillation mode are formed by the rigidity-increasing members in the present embodiment. The support members 5-1 and 5-2 constitute a closed frame together with the rigidity-increasing members 3-1 and 3-2. Thus, the support members 5-1, 5-2, and the rigidity-increasing members 3-1 and 3-2 prevent ingression of dust from outside to an optical path between the optical member 1 and the holding member 7. If another optical member 11 is provided between the optical member 1 and the image pickup element 6 as illustrated in FIG. 1C, the support members 5-1, 5-2 may seal between the optical member 1 and the optical member 11.

The support member 5-1 and 5-2 are made of a flexible material (which has the Young's modulus of less than 0.1 GPa). In particular, the support members 5-1 and 5-2 are made of an elastic member, such as felt, foamed resin, such as urethane foam, and rubber. Therefore, even if the support members 5-1 and 5-2 are provided across multiple loop positions of oscillation in the first oscillation mode and in the second oscillation mode, it is hard to disturb the first oscillation mode and the second oscillation mode.

The rigidity-increasing members 3-1 and 3-2 are made of a material with relatively high, such as a metallic material, of which longitudinal elastic modulus (i.e., the Young's modulus) is preferably 10 GPa or greater and more preferably 50 GPa or greater. Examples of the material include metallic materials, such as iron, copper, aluminum and zinc, and alloys, such as brass and stainless steel. Therefore, the increased rigidity in the Y direction disturbs oscillation in the third driving mode which has bending deflection in the Y direction. The natural frequency of the third driving mode is high.

Figure 15A:
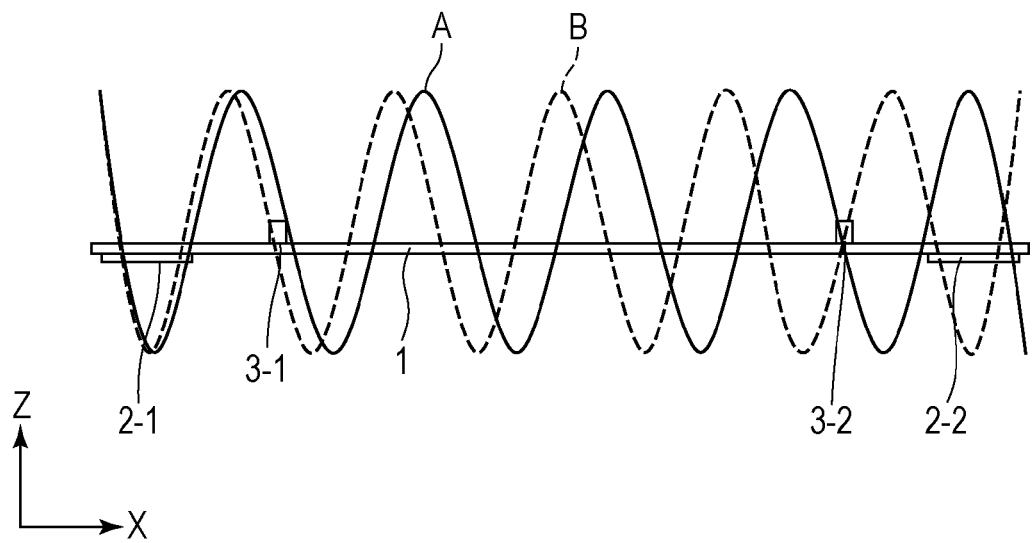
FIG. 15A illustrates, in a schematic diagram, displacement distribution in the Z direction
Figure 15B:
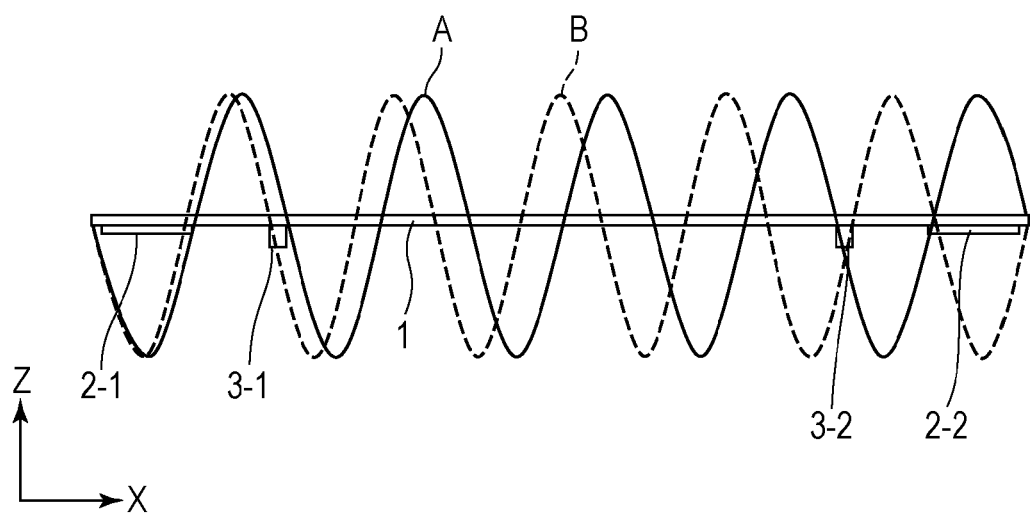
FIG. 15B illustrates, in a schematic diagram, distortion distribution in the X direction, of each oscillation mode produced in an oscillation body.

FIG. 15A illustrates displacement distribution in the Z direction of oscillation in the first and second oscillation modes excited in the oscillation body 4 by the piezoelectric elements 2 in the optical member 1 on the surface opposite to the surface on which the piezoelectric elements 2 are provided, and illustrates a positional relationship of the piezoelectric elements 2 and the rigidity-increasing members 3-1 and 3-2. FIG. 15B illustrates distortion distribution in the X direction of oscillation in the first and second oscillation modes in the optical member 1 on a surface on which the piezoelectric elements 2 are provided, and illustrates a positional relationship between the piezoelectric elements 2 and the rigidity-increasing members 3-1 and 3-2.

Since the rigidity-increasing members 3-1 and 3-2 are provided at positions at which distortion in the X direction of oscillation in first oscillation mode A and in the second oscillation mode B is zero, it is hard to disturb oscillation in the first oscillation mode A and in the second oscillation mode B. Since the rigidity-increasing members 3-1 and 3-2 are provided at positions at which displacement in the Z direction is zero (i.e., node positions), oscillation of the optical member 1 is not easily transmitted to the holding member 7 via the rigidity-increasing members 3-1 and 3-2. For this reason, an increase of loss hardly occurs and oscillation in an auditory area is hard to be excited. The natural frequency of oscillation in the first oscillation mode A and in the second oscillation mode B hardly changes.

Therefore, it is possible to reduce an influence of oscillation in the third oscillation mode which is an unnecessary oscillation mode disturbing the falling of dust over the first oscillation mode and the second oscillation mode which are the main oscillation modes for the falling of dust. Since the rigidity-increasing members 3-1 and 3-2 have an additional function to support the optical member 1, there is no increase in number of parts as compared with related art devices.

As described above, according to the present embodiment, an increased amount of dust adhering to the optical member 1 can be removed by reducing the influence of oscillation in the unnecessary oscillation mode over the oscillation mode effective to the fall of dust without any increase in the number of parts. The driving method of the second embodiment is applicable to the device configuration of the present embodiment.

Fifth Embodiment

Figure 16A:
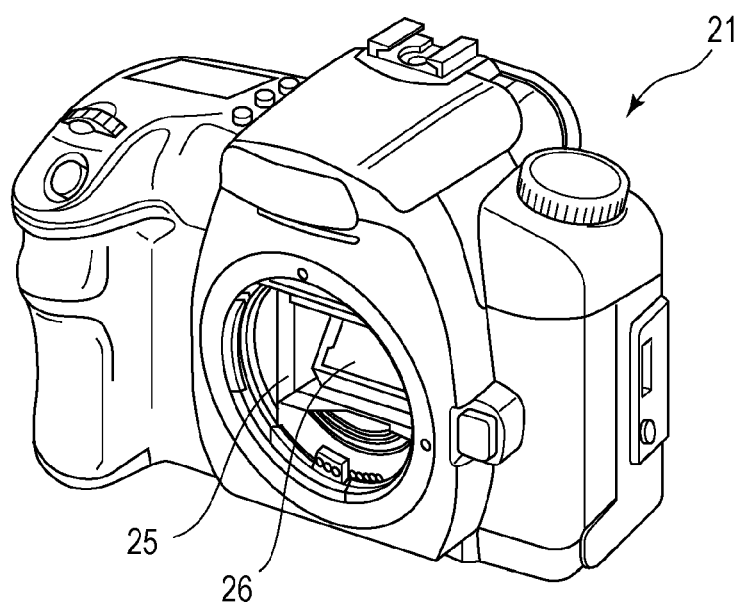
FIGS. 16A and 16B illustrate, in schematic diagrams, an image pickup device to which the present invention is applicable.
Figure 16B:
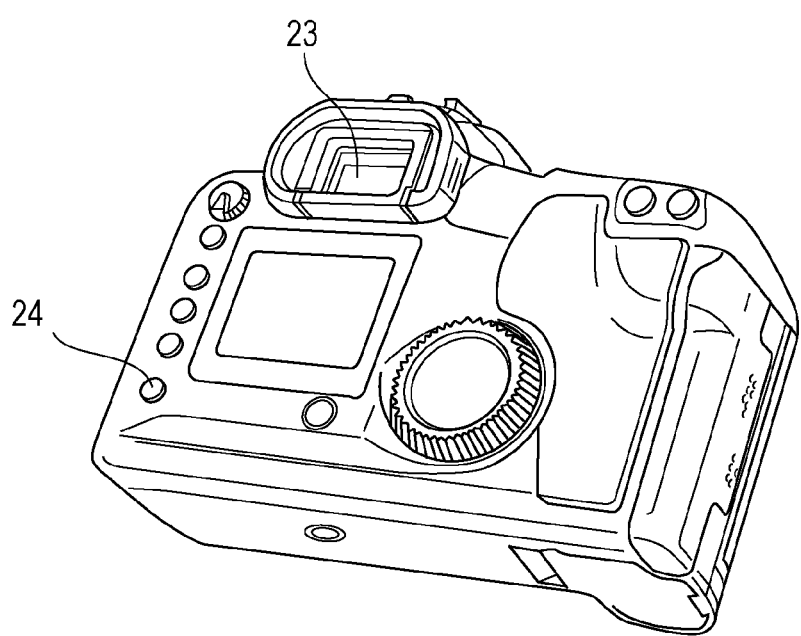
Figure 17:
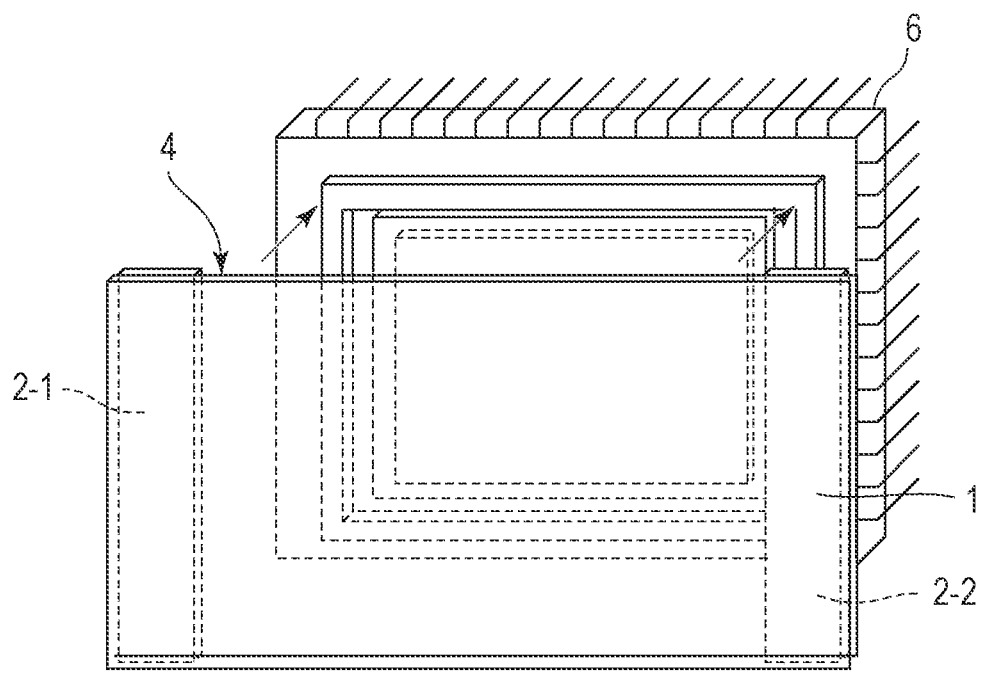
FIG. 17 illustrates, in a schematic diagram, a configuration of a related art dust removing device.

FIG. 16A is a front perspective view of a digital single lens reflex camera which is an image pickup device seen from a photographic subject side with a photographic lens being removed. FIG. 16B is a rear perspective view of the camera seen from a photographer side. A mirror box 25 in which photographing light beams having passed through an unillustrated photographic lens are introduced is provided in a camera body 21. A main mirror (i.e., a quick return mirror) 26 is disposed in the mirror box 25. The image pickup unit which incorporates the dust removing device described in the first to fourth embodiments is provided on a photographing optical axis having passed through an unillustrated photographic lens. The main mirror 26 can be at two positions: a position at which the main mirror 26 is held at an angle of 45 degrees with respect to the photographing optical axis in order that the photographer observes an image of photographic subject through a viewfinder eyepiece window 23; and a position at which the main mirror 26 retracts from the photographing light beam in order for the introduction in the direction of the image pickup element.

A cleaning instruction switch 24 for driving the dust removing device is provided on the rear side of the camera. When the photographer presses the cleaning instruction switch 24, a driving circuit is instructed to drive the dust removing device.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-256312 filed Nov. 16, 2010, which is hereby incorporated by reference herein in its entirety.

What is claimed is:

1. A dust removing device, comprising
an oscillation body including at least an elastic member and an electromechanical energy conversion element which is fixed to the elastic member, wherein the electromechanical energy conversion element is configured to excite oscillation in the elastic member to remove dust; and
a driving circuit configured to apply an alternating voltage to the electromechanical energy conversion element,
wherein the alternating voltage is applied to excite oscillation in a first oscillation mode and oscillation in a second oscillation mode which are the same in direction of the node line and different in order, wherein a rigidity-increasing member configured to enhance rigidity of the oscillation body in the direction of the node line of the oscillation is provided on at least one of the elastic member and the electromechanical energy conversion element, and wherein the width of the rigidity-increasing member along a direction perpendicular to the node line is not larger than ½ of the wavelength of any one of the first oscillation mode and the second oscillation mode of the smaller order.

2. The dust removing device according to claim 1, wherein the rigidity-increasing member is provided at a position at which distortion of the elastic member in the direction perpendicular to the node line is zero.

3. The dust removing device according to claim 1, wherein:
the electromechanical energy conversion element includes a first electromechanical energy conversion element and a second electromechanical energy conversion element, wherein the driving circuit is configured to apply a first alternating voltage to the first electromechanical energy conversion element and to apply a second alternating voltage to the second electromechanical energy conversion element, wherein waveforms of the first alternating voltage and the second alternating voltage have a frequency at which composite oscillation of oscillation in a first oscillation mode and oscillation in a second oscillation mode, which are the same in direction of the node line and different in order, is excited in the elastic member, and wherein the first alternating voltage and the second alternating voltage have different phases.

4. The dust removing device according to claim 1, wherein the Young's modulus of the rigidity-increasing member is not less than 10 GPa.

5. An image pickup device, comprising:
the dust removing device according to claim 1; and
an image pickup element provided at a position at which a light beam having passed through the elastic member of the dust removing device enters.

6. An image pickup device, comprising:
the dust removing device according to claim 1;
an image pickup element provided at a position at which a light beam having passed through the elastic member of the dust removing device enters; and
a holding member configured to hold the elastic member, wherein the rigidity-increasing member is configured to urge the elastic member and lets the elastic member be fixed to the holding member.

7. An image pickup device, comprising:
the dust removing device according to claim 1;
an image pickup element provided at a position at which a light beam having passed through the elastic member of the dust removing device enters; and
a support member configured to support the elastic member, wherein a part of the support member which is parallel to the node line is formed by the rigidity-increasing member.

8. A dust removing device, comprising:
an elastic member and an electromechanical energy conversion element which is fixed to the elastic member and is configured to excite oscillation in the elastic member, wherein the oscillation includes oscillation in a first oscillation mode and oscillation in a second oscillation mode which are the same in direction of a node line and different in order, and oscillation in a third oscillation mode which is different from oscillations in the first and second oscillation modes in the direction of the node line; and natural frequency of the third oscillation mode does not exist between natural frequency of the first oscillation mode and natural frequency of the second oscillation mode.

9. The dust removing device according to claim 8, wherein the electromechanical energy conversion element includes a first electromechanical energy conversion element and a second electromechanical energy conversion element, wherein the dust removing device includes a driving circuit configured to apply alternating voltages to each of the first and second electromechanical energy conversion elements, wherein the alternating voltages comprise alternating voltages of waveforms having frequency between natural frequency of the first oscillation mode and natural frequency of the second oscillation mode, and wherein the alternating voltages have different phases.

10. An image pickup device comprising a dust removing device according to claim 8, and an image pickup element provided at a position at which a light beam having passed through the elastic member of the dust removing device enters.

* * * * *